United States Patent
Schötzau et al.

(10) Patent No.: US 11,331,634 B2
(45) Date of Patent: May 17, 2022

(54) MIXING AND KNEADING MACHINE WITH RECEIVING AREAS FOR KNEADING ELEMENTS, SAID RECEIVING AREAS BEING DISTRIBUTED OVER THE INNER CIRCUMFERENTIAL SURFACE OF THE HOUSING IN A NON-UNIFORM MANNER

(71) Applicant: BUSS AG, Pratteln (CH)

(72) Inventors: Martin Schötzau, Augst (CH); Wolfgang Walter, Aalen (DE)

( * ) Notice: Subject to any disclaimer, the term of this patent is extended or adjusted under 35 U.S.C. 154(b) by 79 days.

(21) Appl. No.: 16/756,688

(22) PCT Filed: Oct. 5, 2018

(86) PCT No.: PCT/EP2018/077199
§ 371 (c)(1),
(2) Date: Apr. 16, 2020

(87) PCT Pub. No.: WO2019/076656
PCT Pub. Date: Apr. 25, 2019

(65) Prior Publication Data
US 2020/0238235 A1    Jul. 30, 2020

(30) Foreign Application Priority Data

Oct. 17, 2017 (EP) .................................. 17196908
Jan. 19, 2018 (EP) .................................. 18152448

(51) Int. Cl.
*B01F 7/08* (2006.01)
*B29C 48/45* (2019.01)
(Continued)

(52) U.S. Cl.
CPC .......... *B01F 7/086* (2013.01); *B01F 7/00416* (2013.01); *B29B 7/421* (2013.01);
(Continued)

(58) Field of Classification Search
CPC ...... B01F 2215/0049; B01F 2215/0422; B01F 7/00416; B01F 7/086; B29B 7/421;
(Continued)

(56) References Cited

U.S. PATENT DOCUMENTS 3,458,894 A    8/1969  Wheeler
3,618,903 A    11/1971 Ronner et al.
(Continued)

FOREIGN PATENT DOCUMENTS

CH    278575 A    10/1951
CH    464656 A    10/1968
(Continued)

OTHER PUBLICATIONS

International Search Report for corresponding PCT Application No. PCT/EP2018/077199 dated Dec. 18, 2018.
(Continued)

*Primary Examiner* — Tony G Soohoo
(74) *Attorney, Agent, or Firm* — Wood, Phillips, Katz, Clark & Mortimer

(57) ABSTRACT

With a mixing and kneading machine (100), wherein a worm shaft (12) moves in a housing (10) in a rotating manner and moves back and forth in a translatory movement, receptacles for kneading elements (12) are distributed non-uniformly. It is thereby possible to equip the receptacles with varying numbers of kneading elements. Quick adaptation is also thereby possible. In one embodiment, the number of kneading elements even varies over the extension direction of the mixing and kneading machine (100).

15 Claims, 15 Drawing Sheets

(51) Int. Cl.
  *B29C 48/565* (2019.01)
  *B29C 48/685* (2019.01)
  *B01F 7/00* (2006.01)
  *B29B 7/42* (2006.01)

(52) U.S. Cl.
  CPC .............. *B29B 7/423* (2013.01); *B29B 7/429* (2013.01); *B29C 48/45* (2019.02); *B29C 48/565* (2019.02); *B29C 48/687* (2019.02); *B01F 2215/0049* (2013.01); *B01F 2215/0422* (2013.01)

(58) Field of Classification Search
  CPC ......... B29B 7/423; B29B 7/428; B29B 7/429; B29C 48/45; B29C 48/565; B29C 48/687
  USPC .................................... 366/69–100
  See application file for complete search history.

(56) References Cited

U.S. PATENT DOCUMENTS

| | | | | |
|---|---|---|---|---|
| 3,804,382 A * | 4/1974 | Pultz | ............. | B29C 48/402 366/84 |
| 3,841,611 A * | 10/1974 | Ronner | ............. | B29B 7/428 366/78 |
| 3,938,783 A | 2/1976 | Porter | | |
| 4,361,081 A * | 11/1982 | Howard | ............. | B30B 9/12 99/348 |
| 4,504,150 A * | 3/1985 | De Vries | ............. | B29C 48/92 366/80 |
| 4,538,917 A * | 9/1985 | Harms | ............. | B29C 48/767 366/75 |
| 4,573,799 A * | 3/1986 | Anders | ............. | B29C 48/268 366/89 |
| 4,581,992 A * | 4/1986 | Koch | ............. | B30B 9/121 100/117 |
| 4,629,326 A * | 12/1986 | Huis | ............. | B29C 48/395 366/80 |
| 4,629,327 A * | 12/1986 | Capelle | ............. | B29C 48/92 366/80 |
| 4,678,339 A * | 7/1987 | Peiffer | ............. | B29C 48/687 366/76.93 |
| 4,735,565 A * | 4/1988 | Capelle | ............. | B29C 48/397 425/208 |
| 4,960,328 A * | 10/1990 | Schumacher | ......... | B30B 11/248 366/80 |
| 5,147,198 A * | 9/1992 | Capelle | ............. | B29B 7/421 425/205 |
| 5,215,374 A * | 6/1993 | Meyer | ............. | B29C 48/53 366/90 |
| 5,244,373 A * | 9/1993 | Capelle | ............. | B29B 7/421 425/208 |
| 5,302,019 A * | 4/1994 | Henschel | ............. | B01F 7/048 366/80 |
| 5,304,054 A * | 4/1994 | Meyer | ............. | B29C 48/395 425/208 |
| 5,324,108 A * | 6/1994 | Baumgarten | ......... | B29C 48/397 366/80 |
| 5,362,146 A * | 11/1994 | Nogossek | ............. | B29C 48/92 366/82 |
| 6,250,791 B1 * | 6/2001 | Schneider | ............. | B29B 7/422 366/80 |
| 7,909,500 B2 | 3/2011 | Grutter et al. | | |
| 9,168,676 B2 | 10/2015 | Siegenthaler | | |
| 2015/0367531 A1 * | 12/2015 | Samborn | ............. | B29C 48/45 366/78 |
| 2020/0238235 A1 * | 7/2020 | Schotzau | ............. | B29C 48/687 |

FOREIGN PATENT DOCUMENTS

| | | |
|---|---|---|
| CH | 695934 A5 | 10/2006 |
| CH | 701030 A2 | 11/2010 |
| CN | 202318878 U | 7/2012 |
| CN | 206426435 U | 8/2017 |
| DE | 2235784 A1 | 1/1974 |
| DE | 3132429 C2 | 2/1983 |
| DE | 4141328 C1 | 2/1993 |
| EP | 0082494 A1 | 6/1983 |
| EP | 0140846 A2 | 5/1985 |
| EP | 1815958 A1 | 8/2007 |
| EP | 2018946 A2 | 1/2009 |
| JP | H07276462 A | 10/1995 |

OTHER PUBLICATIONS

Office Action for corresponding India Application No. 202047016526 dated Feb. 3, 2022.

* cited by examiner

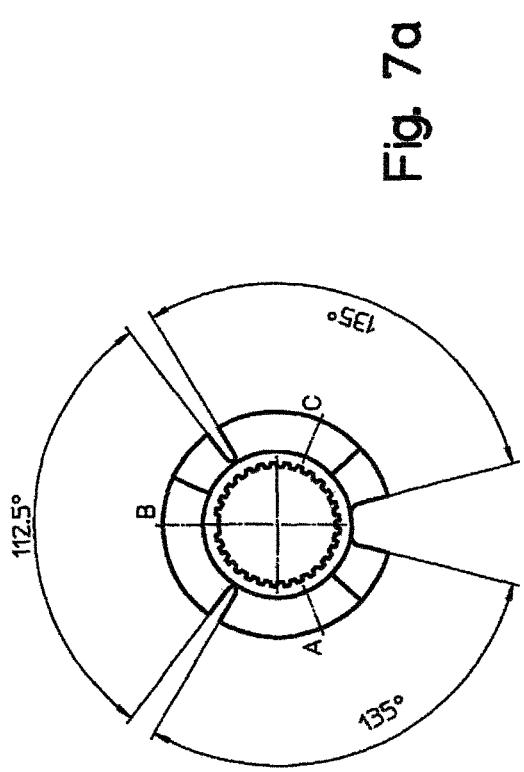
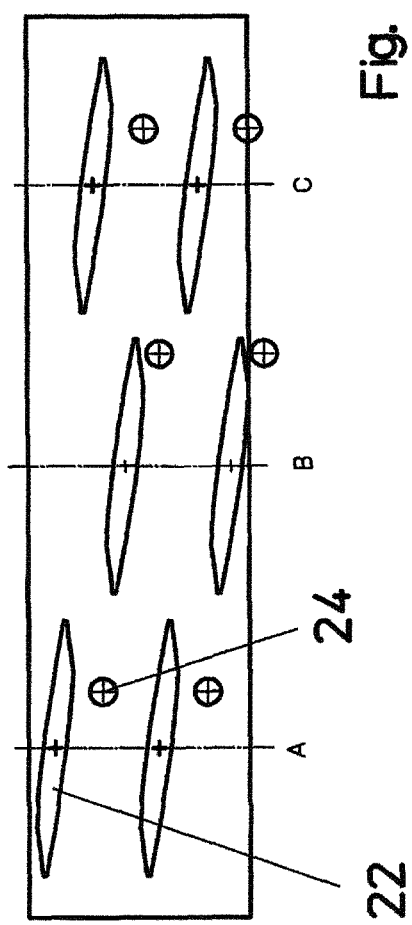

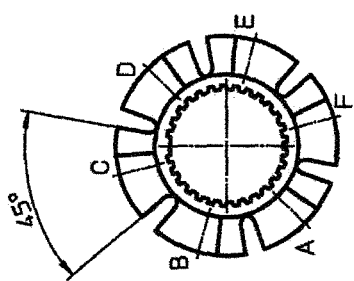
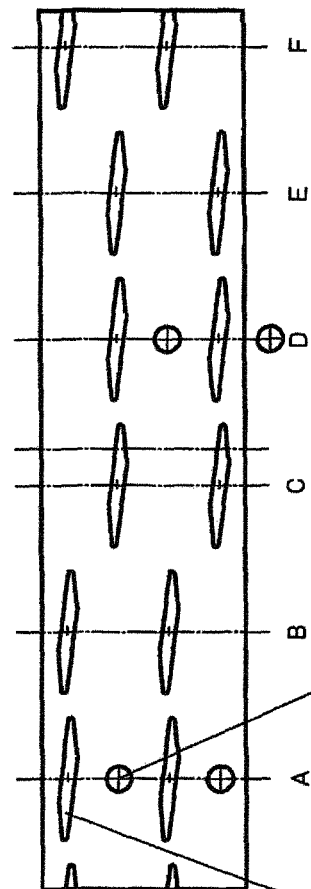

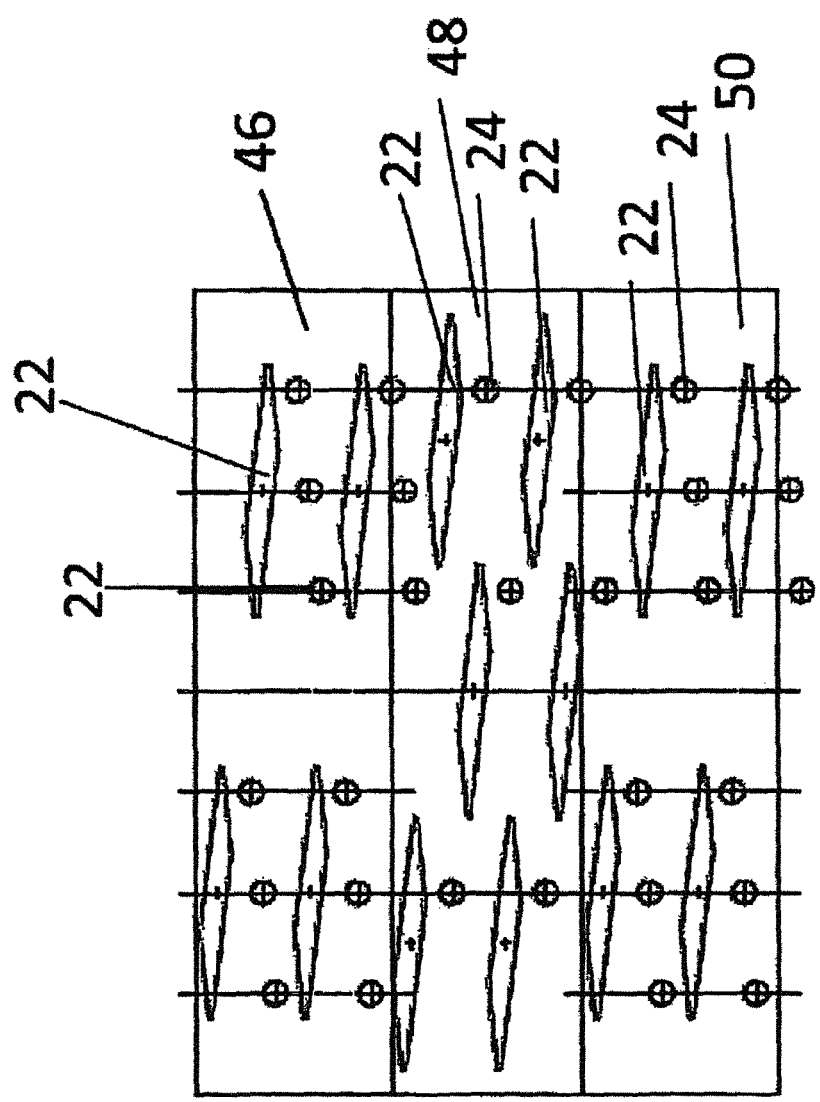

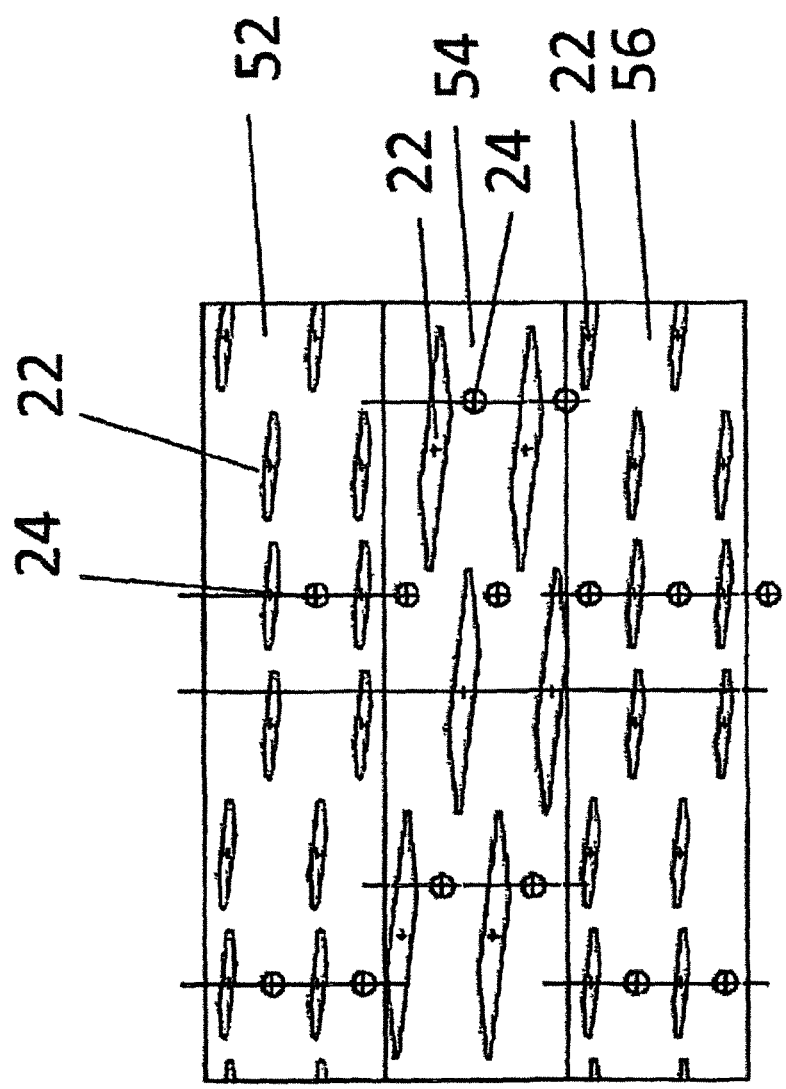

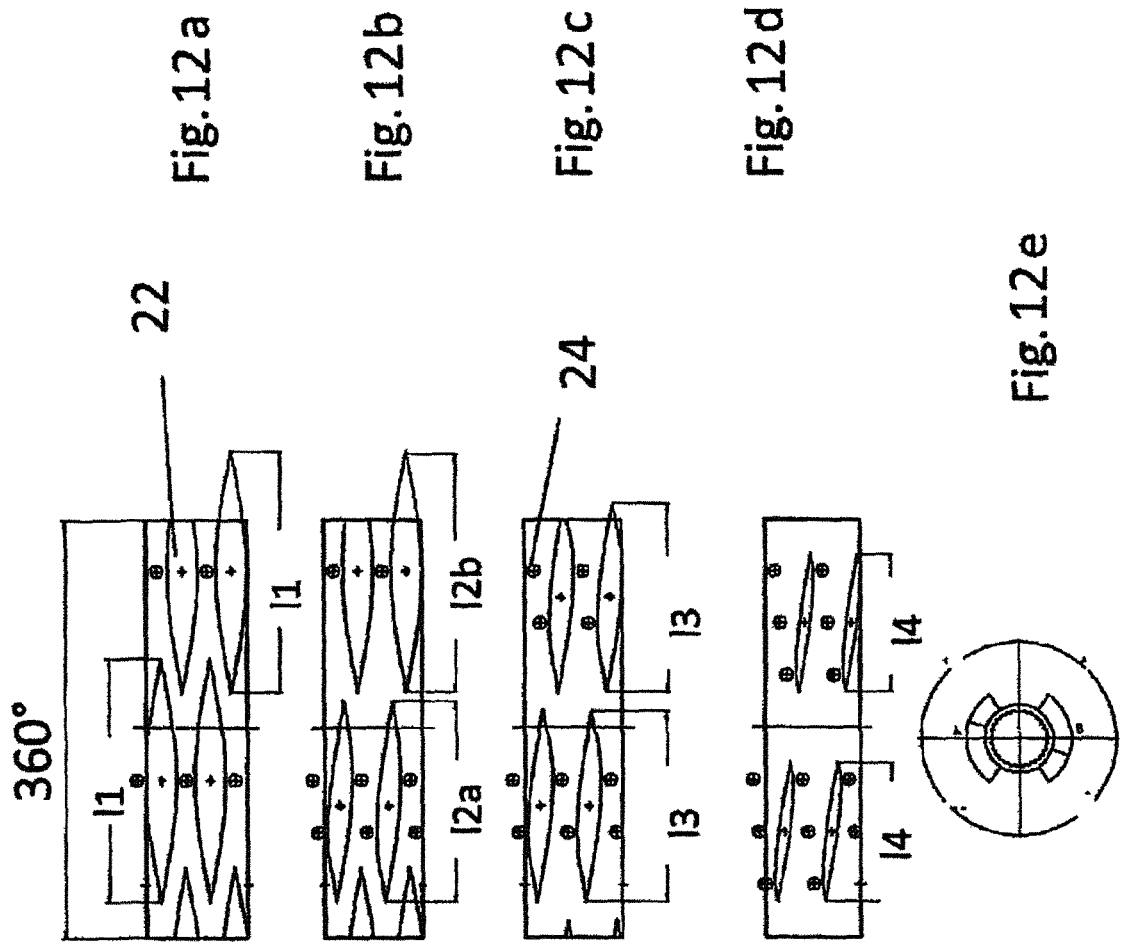

MIXING AND KNEADING MACHINE WITH RECEIVING AREAS FOR KNEADING ELEMENTS, SAID RECEIVING AREAS BEING DISTRIBUTED OVER THE INNER CIRCUMFERENTIAL SURFACE OF THE HOUSING IN A NON-UNIFORM MANNER

The present invention relates to a mixing and kneading machine for continual processing with i) a housing, in which a hollow interior limited by the inner peripheral surface of the housing is formed, with ii) a worm shaft extended at least in some sections in the axial direction through the interior, which rotates during operation in the interior and simultaneously moves back and forth in a translatory movement in the axial direction, and with iii) at least six receptacles for kneading elements provided in the housing, extending at least in some sections from the inner peripheral surface of the housing into the housing, wherein the receptacles are arranged on the inner peripheral surface of the housing in at least two rows extending in the axial direction over at least one section of the inner peripheral surface of the housing, wherein iv) the worm shaft comprises a shaft bar, on the circumferential surface of which at least two blade elements are arranged to extend radially outwards from the shaft bar in the direction of the inner peripheral surface of the housing.

Such mixing and kneading machines are used particularly for the preparation of malleable and/or paste-like masses. For example, they are used for the preparation of viscoplastic masses, for the homogenisation and plasticisation of plastics, the incorporating of filling and reinforcing materials and the manufacture of raw materials for the food industry. The worm shaft hereby forms the working element, which transports or conveys the material to be processed forwards in the axial direction and thereby mixes the components of the material together.

These mixing and kneading machines can particularly be operated in such a way that a melting is initially produced before the such produced melting is conveyed by the worm shaft in the axial direction through the mixing and kneading machine and thereby homogenised. Depending on the material to be mixed, the temperature set in the mixing and kneading machine can be at least in some sections between 50° and 400° C. A mixture made of at least two components, what is termed a "dry blend", can thereby be fed into the mixing and kneading machine, from said dry blend the meltable components are melted in the mixing and kneading machine and then all components are homogenised. In other processes, it is in turn expedient to initially produce a melt from one component in the upstream axial section of the mixing and kneading machine and then add one or more further components in the therefrom downstream axial section, before the components of the mixture being thus created are homogenised further downstream.

Such generic mixing and kneading machines are for example known from CH 278 575 A and CH 464 656.

In these mixing and kneading machines, the worm shaft does not just perform a rotary movement, but also moves at the same time in the axial direction, i.e., in the longitudinal direction of the worm shaft, translationally back and forth. The movement sequence is therefore characterised preferably in that the worm shaft as seen in the axial direction performs an oscillating movement being superimposed over the rotation, i.e., a sinusoidal movement being superimposed over the rotation. This movement sequence enables the housing-side introduction of fittings, namely kneading elements, such as kneading bolts or kneading cogs. Kneading bolts are for example bolts being screwed into corresponding receptacles arranged on the inner peripheral surface of the housing, wherein the kneading bolts can be designed to be both solid and internally hollow. In the latter case, a fluid can be fed into the interior of the mixing and kneading machine through the internally hollow bolts in order to become part of the mixture located in the interior. Kneading cogs have a special form, which interacts with the blade elements of the worm shaft, i.e., the kneading blades. Due to the presence of the kneading bolts or kneading cogs, the worm conveyor being arranged on the main shaft, what is termed the shaft bar, does not—as seen in the cross-sectional direction of the shaft bar—run continuously, but is subdivided into a multitude of individual blade elements. The rotation and the translatory movement of the worm shaft in the axial direction are controlled such that the individual blade elements come close to the corresponding kneading elements, in order to condense the material being mixed and kneaded and to exert a shearing action on same in order to facilitate the mixing and/or kneading process without the kneading elements colliding with the blade elements. Such mixing and kneading machines are particularly known from the company BUSS AG in Pratteln in Switzerland and are distributed under the brand name BUSS Co-Kneader.

Typically, the kneader housing comprises three or four rows of kneading elements extending in the axial direction of the mixing and kneading machine, wherein the individual rows of kneading elements are partitioned evenly over the cross-sectional circumference of the inner peripheral surface of the kneader housing. In other words, the rows of kneading elements are distributed over the cross-sectional circumference of the usually cylindrical inner peripheral surface of the kneader housing in such a way that the angular distances between the kneading elements of the different axially extending rows are each equal to the circular cross-sectional circumference of the cylindrical inner peripheral surface of the kneading element. If the mixing and kneading machine has for example 6 kneading element rows, the angular distances between each two neighbouring kneading elements on the cross-sectional circumference of the inner peripheral surface of the kneader housing each amount to 60°. Thus, the kneading elements of the individual rows are usually arranged slightly offset against their neighbouring rows on the inner peripheral surface of the housing, as seen in the axial direction of the kneader housing, so that the individual blade elements of the worm shaft do not collide with the kneading bolts when the worm shaft rotates and moves back and forth in a translatory movement at the same time. The individual kneading elements, which are fixed into the receptacles of the housing interior wall, thereby extend from the inner peripheral surface of the housing radially into the cylindrical interior limited by the housing inner peripheral surface. The housing is frequently designed in several parts. The housing thereby comprises at least two mutually connected housing parts, from which each can consist of an outer housing and an interchangeable housing shell or wear shell arranged on the inner peripheral surface thereof. In the present patent application, the housing shell(s) is/are deemed to be a component of the housing. For this reason, in the present patent application, the inner peripheral surface of the housing shell(s) is deemed to be the housing inner peripheral surface, if the housing has housing shell(s). In order to guarantee an easy replacement of kneading elements, for example, after incurred wear or due to a procedural adjustment, the individual kneading elements are frequently inserted into the housing shells through a bore acting as a receptacle and secured from the outside by a threaded nut arranged on the outer peripheral surface of the outer housing. A replacement of the kneading elements is thereby easily possible. Other mixing and kneading machines have kneading elements, which are fastened by means of a press fit into the receptacles of the inner peripheral surface of the housing shell or housing. Then the kneading elements can only be replaced with difficulty, as they must first be extracted and new kneading elements must be pressed in, wherefore the individual housing parts (shells) must be dismantled.

The number and geometry of the blade elements is naturally adapted to the number of kneading element rows. If, for example, four rows with kneading elements are arranged on the inner peripheral surface of the housing, the worm shaft can, for example, as seen in the cross-section, have on the circumference thereof four blade elements between which a sufficiently wide distance is respectively provided so that the kneading elements can move through these gaps.

The described mixing and kneading machines are frequently subdivided into various process sections in the axial direction, wherein each process section is occupied by a corresponding number or geometry of blade elements and kneading elements depending on the task allocated thereto during operation. For example, depending on the material to be mixed, a mixing and kneading machine comprises in the axial direction a feed-in section positioned at the upstream end in which the components being mixed or kneaded are introduced into the machine, a melting section being connected downstream therefrom in which the components are melted, a mixing and dispersing section in which any aggregate of the components of the material are crushed and mixed as homogeneously as possible with each other, and a degassing section in which the mixture is degassed. It has already been proposed that a different number of kneading elements be provided in individual sections of the mixing and kneading machine than in other sections, in order to adjust the conditions in the individual sections to the requirements of the different process sections. It is therefore possible to provide the housing shell—as seen in the axial direction—with several mutually separated housing shell sections, which makes it possible for individual axial sections of the housing to be equipped with a different number of kneading elements. For example, it is known to arrange the worm shaft of a mixing and kneading machine in some sections with three blades and in some sections with four blades, and to accordingly equip the corresponding sections of the housing interior wall of the mixing and kneading machine with respectively three or four rows of kneading elements. This can be realised in that the housing is subdivided into several housing shells, of which some have three rows of receptacles for kneading elements and the others four rows. On the other hand, it is not possible to provide shell(s) with four rows in place of the shell(s) with three rows of receptacles for kneading elements and only equip three of said rows with kneading elements, as the partitioning by 120° (three-bladed) does not match the partitioning by 90°, as they have four blade elements. If therefore a device provided for a special raw material to be mixed with regards the equipping of the individual process sections with rows of kneading elements and the provision of corresponding blade elements on the shaft bar of the worm shaft were to be optimised for a different application using a different raw material to be mixed, then one or a number of the housing shells must be replaced by the corresponding one or number of other housing shells with another equipping of kneading elements and then be fitted in accordance therewith to the corresponding section(s) of the worm shaft with corresponding different blade elements.

In general, it is laborious in the prior art to adapt a mixing and kneading machine in accordance with a different raw material to be mixed, particularly in terms of the number of rows of kneading elements and the corresponding number of blade elements on the worm shaft.

It is therefore the object of the present invention to provide a mixing and kneading machine which can be easily adapted in view of the number and arrangement of the kneading elements, and in such a way that the mixing and kneading machine is still characterised by an optimal efficiency level in relation to the material throughput per time unit after the adaptation.

This object is achieved according to the invention by a mixing and kneading machine for continual processing, wherein the mixing and kneading machine comprises:
  a housing, in which a hollow interior limited by the inner peripheral surface of the housing is designed,
  a worm shaft extending at least in some sections in the axial direction through the interior, which rotates during operation in the interior and simultaneously moves back and forth in a translatory movement in the axial direction, and
  at least five (preferably at least six, further preferably at least ten and particularly preferably at least sixteen) receptacles for kneading elements provided in the housing, extending at least in some sections from the inner peripheral surface of the housing into the housing, wherein the receptacles are arranged on the inner peripheral surface of the housing in at least two rows extending in the axial direction over at least one section of the inner peripheral surface of the housing, wherein preferably at least one, more preferably at least two and particularly preferably all of the at least two rows each comprise at least three (preferably at least five and particularly preferably at least eight) receptacles for kneading elements,
  wherein the worm shaft preferably comprises a shaft bar, on the circumferential surface of which at least two blade elements are arranged extending radially outwards from the shaft bar in the direction of the inner peripheral surface of the housing,
  wherein at least in one section extending in the axial direction of the housing the receptacles for kneading element, as seen in the cross-section of the housing, are distributed non-uniformly over the circumference being defined by the inner peripheral surface of the housing (preferably the receptacles for kneading elements of the at least two rows, as seen in the cross-section of the housing, are distributed asymmetrically over the circumference being defined by the inner peripheral surface of the housing).

The mixing and kneading machine according to the invention is characterised in that the receptacles for kneading elements of each of the at least two rows extending in the axial direction over at least one section of the inner peripheral surface of the housing, as seen in the cross-section of the housing, are distributed non-uniformly over the circumference being defined by the inner peripheral surface of the housing. A non-uniform distribution of the receptacles for kneading elements over the circumference defined by the inner peripheral surface of the housing is understood in the sense of the present invention to mean that—as viewed in the cross-section of the housing—of all the distances or angular distances between each two receptacles for kneading elements of neighbouring rows on the inner peripheral surface of the housing, at least two distances or at least two angular distances are mutually different. If therefore the section of the housing comprises four rows each with at least five receptacles for kneading elements, the angular distance of the receptacles of neighbouring rows on the inner peripheral surface of the housing—as in the prior art—do not each amount to 90°, rather at least two of the four angular distances are different to 90°. As stated above, the receptacles for kneading elements of each row are preferably arranged slightly offset against their neighbouring rows, as seen in the axial direction of the kneader housing, so that the individual blade elements of the worm shaft do not collide with the therein received kneading bolts when the worm shaft rotates and moves back and forth in a translatory movement at the same time. The angular distance of receptacles of two neighbouring rows on the inner peripheral surface of the housing is therefore understood as the angular distance between the receptacle of a first row and the point of the straight line running through the central points of the receptacles of the neighbouring row, which—in relation to the longitudinal direction of the housing—is positioned perpendicularly above or below the receptacle of the first row, on the inner peripheral surface of the housing. According to the invention, in contrast to the mixing and kneading machines known from the prior art, not all distances on the inner peripheral surface of the housing are equal between each two receptacles for kneading elements of neighbouring rows.

In contrast to, for example, the case of the mixing and kneading machine according to CH 464 656 A, wherein, as seen in the cross-section of the housing with circular inner peripheral surface, six rows of receptacles for kneading elements are provided exactly at angular distances of 60° each to the inner peripheral surface of the housing, so that this fits exactly to a three-bladed or six-bladed worm conveyor, the present invention therefore deliberately provides a deviation from an exact division. This serves to facilitate the alternative realisation of several versions of occupations of the receptacles in view of the number and arrangement of the kneading elements in a simple manner, namely while maintaining an optimal efficiency level of the mixing and kneading machine in relation to the material throughput per time unit. If, for example, six rows of receptacles for kneading elements extending in the axial direction of the mixing and kneading machine are provided on the housing inner peripheral surface, then through the non-uniform distribution of the rows on the inner peripheral surface of the housing, as seen in the cross-section, it is effected that an occupation of just four or three rows with kneading elements can also be provided as an alternative to an occupation of all rows with kneading elements, and namely two or three of the receptacle rows can be left vacant, wherein the occupied rows are still arranged at a distance from each other such that an optimal efficiency level of the mixing and kneading machine is achieved in relation to the material throughput per time unit. The corresponding occupation of the worm shaft with blade elements can or must be designed to match therewith; a non-uniform extension of the blade elements over the angular section areas of the worm shaft can be provided to match the non-uniform distribution of the receptacles over the inner peripheral surface of the housing. In contrast thereto, an occupation of 6 rows of receptacles evenly spaced according to the prior art leads in the case of an occupation of just four or three rows, as substantiated in more detail below, to a loss in efficiency during the operation of the mixing and kneading machine.

A receptacle for kneading elements is deemed in the sense of the present invention to be a cavity on the inner peripheral surface of the housing, which is designed such that a kneading element, i.e., a kneading bolt, a kneading cog, or the like, can be arranged therein and fastened therethrough in such a way that the kneading element extends from the inner peripheral surface of the housing radially inwards into the hollow interior. The receptacle can be a depression, recess, bore, or the like, which extends more or less deeply from the inner peripheral surface of the housing into the housing. Preferably, at least one of the receptacles is a recess, depression or bore and each of the receptacles are advantageously a groove, depression or bore. In the case of a typical two-component design of the housing of an external housing and housing shell arranged radially inwards thereon, the receptacle extends from the inner peripheral surface of the housing shell thereinto and possibly also into the outer housing and possibly through the outer housing. In the case of a single-component design of the housing, the receptacle thereby extends from the inner peripheral surface of the housing thereinto and possibly therethrough.

By a row of receptacles for kneading elements extending in the axial direction of the mixing and kneading machine over at least one section of the inner peripheral surface of the housing, it is understood in the sense of the present invention that a connecting line being positioned over the centre points of the receptacles of a row, said receptacles being spaced from each other in the axial direction, is at least substantially a straight line, wherein the maximum deviation of the connecting line from a straight line is less than 10°, preferably less than 5° and further preferably less than 2° in relation to the cross-sectional circumference of the inner peripheral surface of the housing. Thus, each of the rows of receptacles can extend over the entire axial length of the housing inner peripheral surface or over a specific section of the length of the housing inner peripheral surface. However, according to the invention, the rows of at least one axial section of the housing each comprise at least three, preferably at least five and very particularly preferably at least eight receptacles for kneading elements. Preferably, all rows extend respectively over the same section of the housing inner peripheral surface or the entire axial length of the housing inner peripheral surface.

The housing according to the invention is preferably comprised of at least two housing parts, which can be folded away from each other or separated from each other to open the housing, wherein the housing parts in the closed state preferably form a (hollow) interior being circular in cross-section.

Preferably at least on the section of the circumferential surface of the shaft bar of the worm shaft extending in the axial direction of the housing, said worm shaft being positioned in the section of the inner peripheral surface of the housing over which the at least two, respectively at least three rows comprising receptacles for kneading elements are arranged to extend in the axial direction of the housing, at least six blade elements extended radially outwards from the shaft bar in the direction of the inner peripheral surface of the housing, wherein the blade elements on this section of the shaft bar are arranged in at least two rows extending in the axial direction over this section of the circumferential surface of the shaft bar, wherein at least two and preferably all of the at least two rows—as seen in the axial direction—comprise at least three (preferably at least five and particularly preferably at least eight) blade elements. If the shaft bar contains more than two rows, such as for example six, rows of blade elements, then at least 2 rows each comprise—as seen in the axial direction—at least three blade elements, whereas the remaining rows can comprise fewer than three blade elements or more than three blade elements. Thus, the individual rows can be equipped such that in the section—as seen in the axial—two-bladed and three-bladed or two-bladed and four-bladed or three-bladed and four-bladed blade elements are available. It is particularly preferable that the shaft bar has a circular cross-section and on this section of the circumferential surface of the shaft bar of the worm shaft the same number of rows of blade elements is arranged as the number of rows of receptacles for kneading elements, which is arranged in the section of the inner peripheral surface of the housing corresponding to this section. In addition, it is preferable that the rows of blade elements correspond with those of the receptacles for the kneading elements, i.e., that each of the receptacles for a kneading element is allocated a blade element in such a way that during the operation of the mixing and kneading machine the blade element moves back and forth in a translatory movement past the receptacle. With this embodiment, it is furthermore preferable if the blade elements of at least one of the rows differ in the value of the angular section, by which they extend over the cross-sectional circumference of the shaft bar, by the value of the angular section of the blade elements of at least one of the other rows.

According to a particularly preferable embodiment of the present invention, at least one of the receptacles is and very particularly preferably all the receptacles are bore(s). Furthermore, it is preferable that each of these bores extends outwardly from the inner peripheral surface of the housing through the entire housing wall. In the case of a usual housing limiting an interior being circular in cross-section, i.e., of a housing with a cylindrical inner peripheral surface, it is preferable in this embodiment of the present invention that the bores extend radially outwards from the inner peripheral surface of the housing through the entire housing wall—or in the case of a structure of the housing made from a housing wall and housing shell, through the entire housing shell and housing wall—and thus open out on the outer peripheral surface of the housing. It is thereby made possible to attach firmly but easily replaceably to the outer side of the housing by means of a nut a kneading element arranged in the bore or a fixing element arranged in the bore, that can be connected or is connected with the kneading element on the front side oriented towards the inner peripheral surface of the housing. Preferably, a fixing element being connectable with a kneading element extends into each receptacle equipped with a kneading element up to a certain distance from the inner peripheral surface of the housing interior wall, wherein the fixing element is fixed to the outer peripheral surface of the housing by a nut. On the radially inner part of the receptacle, which extends from the inner peripheral surface of the housing interior wall into the bore up to the end of the fixing element, the kneading element is then provided which is connected with the fixing element on the side thereof being opposite the inner peripheral surface of the housing interior wall. For example, the radially inner part of the bore, into which the kneading element is inserted, can be designed to be square in cross-section in order to allow the kneading element to be received non-rotatably, whereas the radially outer part of the bore, into which the fixing element is inserted, can be designed to be circular in cross-section. The kneading element can thereby be connected with the fixing element for example by means of screwing, soldering, welding or hot isostatic pressing. Thus, in this embodiment, the technology of pressing in the kneading elements is avoided. In this way, the kneading elements can be replaced more quickly or replaced using a blind bolt.

In a further preferred embodiment of the present invention, the inner peripheral surface of the housing is circular in the cross-section and at least one of the angular distances as seen in the cross-section of the housing between two receptacles of neighbouring rows on the inner peripheral surface of the housing deviates from the value of 360°/n by at least 1°, preferably by at least 2.5°, particularly preferably by at 5° and very particularly preferably by at least 10°, wherein n is the number of rows of receptacles. Furthermore, it is particularly preferable that all angular distances between two respective receptacles of neighbouring rows differ compared with the value of 360®/n by at least 1°, preferably by at least 2.5°, particularly preferably by at least 5° and very particularly preferably by at least 10°.

Preferably, 2 to 11, further preferably 2 to 10, further preferably 3 to 9, particularly preferably 4 to 8, very particularly preferably 5 to 7 and most preferably 6 rows of receptacles for kneading elements are arranged to extend in the axial direction over at least one section of the inner peripheral surface of the housing on the inner peripheral surface of the housing.

Irrespective of whether each row of receptacles extends over the entire length of the inner peripheral surface of the housing or just over a section thereof, it is preferable that each row comprises 1 to 4, preferably 1 to 3 and particularly preferably 1 to 2 receptacles per 1D, wherein 1D is the diameter of the hollow interior limited by the inner peripheral surface of the housing. As shown above, according to the invention, at least one, preferably at least two and particularly preferably all the rows at least of one axial section of the housing each comprise at least three receptacles for kneading elements, preferably each at least five receptacles for kneading elements and particularly preferably each at least eight receptacles for kneading elements. Thereby, all rows can have the same number of receptacles or a different number of receptacles. However, it is preferable that all rows have the same number of receptacles and the receptacles of all rows are each evenly distanced between themselves, wherein however—as stated above—the receptacles of each row can be arranged slightly offset against those of the neighbouring rows, as seen in the axial direction of the kneader housing, so that the individual blade elements of the worm shaft do not collide with the therein received kneading bolts when the worm shaft rotates and moves back and forth in a translatory movement at the same time.

Of the receptacles, all can be occupied with corresponding kneading elements. Alternatively, it is also possible and preferable that not all receptacles and further preferably not all rows of receptacles are occupied with kneading elements. It is thereby preferable that of the n rows of receptacle elements at most n−1 rows are occupied with kneading elements. Through the redundant provision of receptacles, the mixing and kneading machine can be flexibly occupied with kneading elements.

In a specifically preferable embodiment, six rows of receptacles for kneading elements extending in the axial direction are provided on the inner peripheral surface of the housing, of which two rows are each mutually opposite each other in order to form three pairs on the inner peripheral surface of the housing. It is thereby preferable that of the three angular distances, each formed between two neighbouring pairs, two angular distances of the cross-sectional circumference of the housing interior wall are between 20° and 70° and one angular distance is between more than 70° and 120°. The sum of the three angular distances must naturally be 180°. It is thereby preferable if two angular distances of the cross-sectional circumference of the housing interior wall are between 30° and 60° and one angular distance is between 70° and 110° and particularly preferably two angular distances are between 40° and 50° and one angular distance is between 80° and 100°. For example, an arrangement of rows is very particularly preferable wherein two angular distances are about 45° and the other angular distance is about 90°.

Alternatively, the distances of the receptacle rows on the inner peripheral surface of the housing can be displaced with respect to the preceding values. For example, one distance can be 90°+d, wherein then the two other distances are 45°−d/2. Alternatively, one distance can be 90°−d, whereas the two other distances are 45°+d/2, wherein d preferably adopts a value between >0° and 10°.

In an alternative embodiment, six rows of receptacles for kneading elements extending in the axial direction are provided on the inner peripheral surface of the housing, wherein the angular distances of two of the rows respectively to a neighbouring row are 60°, whereas two angular distances between other rows are 60°+d and the two angular distances between the remaining rows are 60°−d, wherein each of the values d is independently of each other between >0° and 10°, preferably between 1° and 10° and particularly preferably between 2° and 8°, with the proviso that the sum of all angles equals 360°.

In an alternative embodiment, five rows of receptacles for kneading elements extending in the axial direction are provided on the inner peripheral surface of the housing, wherein the angular distances between each four neighbouring rows of receptacles is respectively between more than 70° and 120° and the angular distances between the two remaining neighbouring rows of receptacles is respectively between 20° and 70°. It is thereby preferable if four angular distances of the cross-sectional circumference of the housing interior wall are between 70° and 110° and particularly preferably between 80° and 100° and the angular distances between the two remaining neighbouring rows of receptacles are respectively between 30° and 60° and particularly preferably between 40° and 50°, with the proviso that the sum of all angles is 360°.

In a further preferable embodiment of the invention, the worm shaft comprises a shaft bar, i.e., a main shaft, with circular cross-section, on which the blade elements are positioned, wherein at least two of the blade elements are mutually different in the value of the angular section by which they extend to the cross-sectional circumference of the shaft bar, namely particularly match the non-uniform distribution of the kneading elements and the provided axial translatory movement. Through the rotation and the axial translatory movement of the worm shaft, the material being mixed and kneaded is drawn into a gap between the respective blade element and a kneading element, wherein the desired mixing and kneading effect is achieved by the resulting shearing.

It is preferably hereby provided that the blade elements are arranged in two to six and preferably three rows extending axially to the main shaft, wherein all blade elements of a row can extend respectively over the same angular section of the cross-sectional circumference of the main shaft, but the values of the angular sections over which the blade element extends at least between two different rows, can be mutually different, but need not be. For example, it is preferable that the blade elements are arranged in three rows extending axially to the main shaft and the values of the angular section over which the individual blades of a row extend over the cross-sectional circumference of the shaft bar, for two of the three rows are respectively between 20° and 175°, preferably between 128° and 140° and the value of the angular section for the third row is between 20° and 120°, in the preferred case between 110° and 116°.

The present invention also allows that in different sections extending in the axial direction of the housing of the mixing and kneading machine a different number of the rows of receptacles being provided on the inner peripheral surface of the housing is occupied with kneading elements and similarly the thereto corresponding sections of the worm shaft have in the cross-section a different number of blade elements. The housing of the mixing and kneading machine preferably has in this embodiment 2 through 24, more preferably 2 through 16, particularly preferably 3 through 12 and very particularly preferably 8 sections extending in the axial direction, of which at least one section and preferably at least two sections are occupied with a different number of kneading elements than the rest of the sections. In this embodiment, the individual rows of receptacles thus extend over all sections, wherein the connecting line between the receptacles of a row is respectively at least substantially a straight line. Thus, this embodiment permits the simple realisation of a subdivision of the mixing and kneading machine in various process sections being optimal for the process by means of different equipping of sections of the present rows of receptacles with kneading elements, without one or more housing shells of the housing needing to be replaced.

For example, the mixing and kneading machine can be formed to have eight sections, which are each designed in terms of the equipping with kneading elements and in terms of the number and geometry of the blade elements such that on the upstream end a feed-in section into which the components being mixed or kneaded are introduced into the machine, a therefrom downstream connected melting section in which the components are melted, then a further feed-in section in which one or more further components, such as filler, are added to the mixture, then a mixing and homogenising section in which the components of the material are mixed together as homogeneously as possible, then a further feed-in section in which one or more further components, such as additive, are added to the mixture, then a further mixing and homogenising section and finally a degassing section in which the mixture is degassed. The three feed-in sections and the degassing section thereby preferably have a single-bladed worm shaft section and the mixing and homogenising sections preferably have a three-bladed worm shaft section. In addition, it is preferable that the melting section is constructed from two process sections, of which the upstream preferably has a four-bladed worm shaft section and the downstream preferably has a two-bladed worm shaft section. Therefore, the individual, preferably six rows of receptacles for kneading elements in the sections of the housing wall corresponding to these worm shaft sections are preferably so equipped with kneading elements that in the sections of the housing wall corresponding to the feed-in sections, one row of receptacles is occupied with kneading elements, the sections of the housing wall corresponding to the mixing and homogenising sections three rows are occupied with kneading elements, in the upstream of the two process sections of the melting section four rows of receptacles are occupied with kneading elements, and in the downstream of the two process sections of the melting section two rows of receptacles are occupied with kneading elements.

Alternatively thereto or in addition thereto, it is also possible that in different sections extending in the axial direction of the housing of the mixing and kneading machine the same number of the rows of receptacles provided in the inner peripheral surface of the housing is occupied with kneading elements, but in each of the sections or at least in one of the sections, different rows of receptacles are occupied with kneading elements than in at least one other section. Similarly, the corresponding sections of the worm shaft must then also be correspondingly adapted to the arrangement of blade elements. The housing of the mixing and kneading machine preferably has in this embodiment 2 through 24, more preferably 2 through 16, particularly preferably 3 through 12 and very particularly preferably 8 sections extending in the axial direction, of which at least one section and preferably at least two sections are occupied respectively with the same number of kneading elements, but the same rows of receptacles are not occupied with kneading elements as in the rest of the sections. For example, the housing has four neighbouring sections extending in the axial direction and all four sections have respectively 6 equally formed rows of receptacles, of which, for example, the rows 1, 3 and 5 in the first and third section and the rows 2, 4 and 6 in the second and fourth section are occupied with kneading elements, wherein the numbers of the individual rows are assigned respectively in the clockwise direction in the cross-section of the inner peripheral surface of the housing starting from 0 o'clock. Consequently, in this embodiment, the kneading elements of the individual sections, i.e., the receptacles of the individual sections being equipped with kneading elements, are not flush to each other. Also in this embodiment, the individual rows of receptacles thus extend over all sections, wherein the connecting line between the receptacles of a row is respectively at least substantially a straight line. Thus, this embodiment also permits the simple realisation of a subdivision of the mixing and kneading machine in various process sections being optimal for the process by means of different equipping of sections of the present rows of receptacles with kneading elements, without one or more housing shells of the housing needing to be replaced.

In the two aforementioned embodiments, the worm shaft for the sections of rows of receptacles for kneading elements must have corresponding sections and the blade elements in the individual sections must be adapted to the occupation of rows of receptacles with kneading elements in the individual sections. This can be achieved in that the number of blade elements in the individual sections are mutually different as is the number of rows of receptacles being occupied with kneading elements in the corresponding sections, and/or in that the blade elements in the individual sections extend respectively over an angular distance of the cross-sectional circumference of the shaft bar such that the angular distances of the individual blade element rows in the individual sections correspond with the number and distances of the rows of receptacles occupied with kneading elements in the corresponding sections. Consequently, in this embodiment, the blade elements of the individual sections are not necessarily flush to each other.

Thus, according to a first variation, it is preferably provided that of the number of rows of receptacles for kneading elements in a first section of the housing extending in the axial direction a first number of rows is occupied by kneading elements and in a second section of the housing extending in the axial direction a second number of rows is occupied with kneading elements, wherein the second number is different to the first number. A first section of the worm shaft extending in the axial direction is allocated to the first section of the housing extending in the axial direction, where the number of blade elements is a third number, and a second section of the worm shaft extending in the axial direction is allocated to the second section of the housing, where the number of blade elements is a fourth number. In this variation, the fourth number is also different to the third number. Thereby, the first and third number can be equal and the second and fourth number can be equal. However, it is also possible that the first and third number are mutually different and the second and four number are mutually different.

According to a second variation, it is provided that of the number of rows of receptacles for kneading elements in a first section of the housing extending in the axial direction and in a third section of the housing extending in the axial direction (the latter with the same design as the first variation) a first or third number of rows is occupied with kneading elements (the latter particularly with the same design as the first variation), and in a second and a fourth section of the housing extending in the axial direction the same first or third number of rows is occupied with kneading elements as in the first or in the third section of the housing, wherein a corresponding first and third section of the worm shaft extending in the axial direction is allocated to the first and third section of the housing and a second and fourth section of the worm shaft extending in the axial direction is allocated to the second and fourth section of the housing, wherein the number of blade elements in the first and third section of the worm shaft is the same as in the second and fourth section of the worm shaft, wherein however the blade elements in the second and fourth section are displaced against the blade elements in the first and third section of the worm shaft by an offset angle so that the blade elements are not flush. In an embodiment of this second variation, for instance the blade elements are arranged in the first and third section of the worm shaft and in the second and fourth section of the worm shaft respectively in six rows and extend over a respectively identical angle (radian), wherein the angle of extent for each of the six blade elements can be different or identical. Preferably, the blade elements are arranged in the first or third section of the worm shaft and in the second and fourth section of the worm shaft respectively in six rows and extend respectively over an identical angular section of the cross-sectional circumference of the shaft bar of between 15° and 75°, wherein the offset angle is between 10° and 20°, preferably 15°. If a smaller angle (radian) is selected, for example 15° through 40°, then the arrangement of six rows of blade elements can also occur non-symmetrically (60°±30°) on the circumference. Both with the first and second variations, a solution being adapted individually to the type of material and the desired process can be found in some sections using the conveyor line for the material into the mixing and kneading machine for the design of the mixing and kneading machine.

In the further embodiment of the inventive concept, it is proposed that in a first or a third section of the worm shaft the number of rows of blade elements is equal to the number of rows of blade elements in a further section of the worm shaft, wherein however the blade elements in the further section are offset against the blade elements in the first or third section of the worm shaft by an offset angle so that the blade elements are not flush. Preferably, the blade elements are arranged in their first or third section and in their further section respectively in six rows and extend over a respectively identical angle of between 15° and 75°, wherein the offset angle is between 10° and 20°, preferably 15°.

A further object of the present invention is a housing for a mixing and kneading machine, in which a hollow interior limited by the inner peripheral surface of the housing is formed, wherein according to the invention at least six receptacles for kneading elements extending at least in some sections from the inner peripheral surface of the housing into the housing are provided in the housing, wherein the receptacles are arranged on the inner peripheral surface of the housing in at least two rows extending in the axial direction over at least one section of the inner peripheral surface of the housing, wherein at least two and preferably all of the at least two rows each comprise at least three, preferably at least five and particularly preferably at least eight receptacles for kneading elements, and wherein at least in one section extending in the axial direction of the housing, the receptacles for kneading elements, as seen in the cross-section of the housing, are distributed non-uniformly over the circumference being defined by the inner peripheral surface of the housing.

Preferably, the housing comprises at least two housing halves and the inner peripheral surface of the housing is cylindrically formed. Therefore, it is preferable that the housing according to the invention for a mixing and kneading machine comprises at least two housing parts, which can be folded away from each other or separated from each other to open the housing and which provide a hollow interior being circular in cross-section, wherein according to the invention at least six receptacles for kneading elements extending at least in some sections from the inner peripheral surface of the housing into the housing are provided in the housing, wherein the receptacles are arranged on the inner peripheral surface of the housing in at least two rows extending in the axial direction over at least one section of the inner peripheral surface of the housing, wherein at least two and preferably all of the at least two rows each comprise at least three (preferably at least five and particularly preferably at least eight) receptacles for kneading elements, and wherein at least in one section extending in the axial direction of the housing, the receptacles for kneading elements, as seen in the cross-section of the housing, are distributed non-uniformly over the circumference being defined by the inner peripheral surface of the housing. The receptacles can be hereby provided in a housing shell, which is detachable from the rest of the housing. It is preferably provided that each receptacle is a bore extending through the housing shell and housing wall, into which a fixing element can be arranged being connected with the outer wall of the housing. A fluid may also be added to the interior by means of a hollow bolt being inserted into the bore. A bolt in the bore can be further provided with a temperature sensor or pressure sensor.

The characteristics described for the mixing and kneading machine according to the invention are, as applicable, also preferable for the housing according to the invention.

In addition, the present invention relates to a worm shaft for a mixing and kneading machine with a shaft bar with preferably circular cross-section, on the circumferential surface of which at least six blade elements are arranged extending radially outwards from the shaft bar, wherein the blade elements on the shaft bar are arranged in at least two rows extending in the axial direction over at least one section of the circumferential surface of the shaft bar, wherein at least one, preferably at least two and particularly preferably all of the at least two rows—as seen in the axial direction—each comprise at least three (preferably at least five and particularly preferably at least eight) blade elements, and wherein at least two of the blade elements are mutually different in the value of the angular section by which they extend to the cross-sectional circumference of the shaft bar.

It is preferably hereby provided that the blade elements are arranged in three rows extending axially to the main shaft, wherein however the values of the angular sections by which the blade elements extend over the cross-sectional circumference of the main shaft can, but need not, differ at least between two different rows. For example, it is preferable that the values of the angular section, over which the individual blades of a row extend, are between 20° and 120°, preferably between 110° and 116° and the value of the angular section of the second and third row is between 20° and 175°, in the preferred case between 128° and 140°.

Below, the present invention is described in more detail with reference to the drawing, in which:

FIG. 1*a* shows a perspective view of a mixing and kneading machine according to the invention;

FIG. 1*b* shows a schematic longitudinal section through the mixing and kneading machine according to the invention shown in FIG. 1*a*;

FIG. 1*c* shows a cross-section of the upper housing half of the mixing and kneading machine shown in FIG. 1*a*, in which the upper housing half is equipped with a kneading bolt;

Figure 6A:
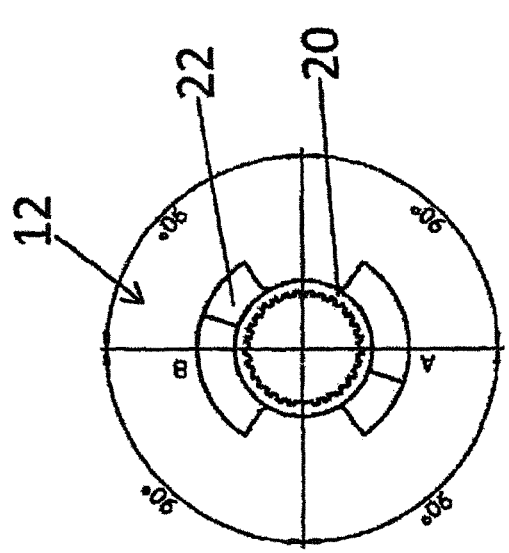

FIG. 6*a* shows the angle graduation of a two-bladed worm shaft; and

Figure 2:
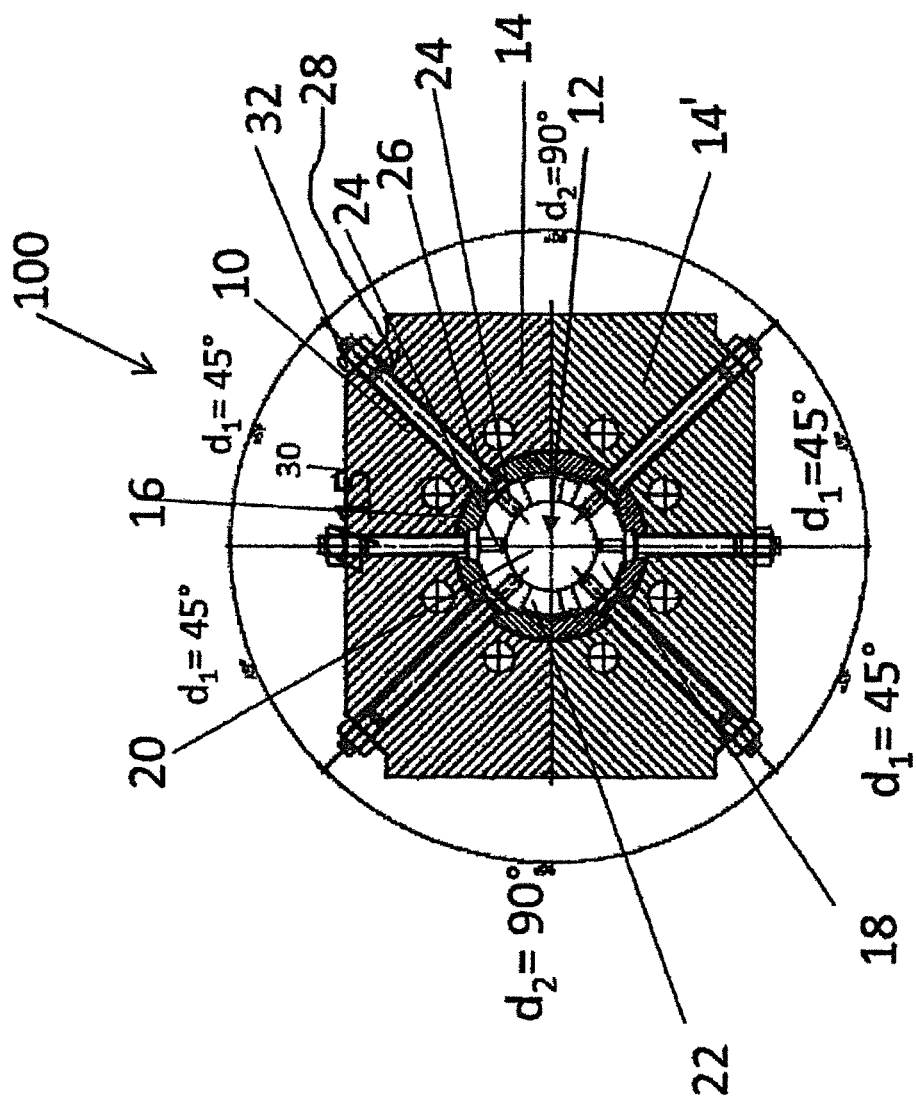
FIG. 2 shows a cross-section through the mixing and kneading machine shown in FIG. 1 a as occupied with six kneading bolts.
Figure 6B:
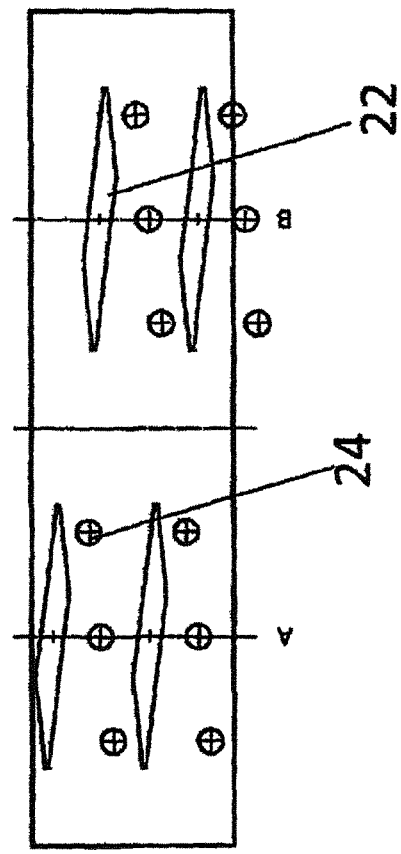

FIG. 6*b* shows the position of the kneading bolts of the six-rowed arrangement from FIG. 2;

FIG. 7*a* shows the angle graduation of a three-bladed worm shaft; and

Figure 4:
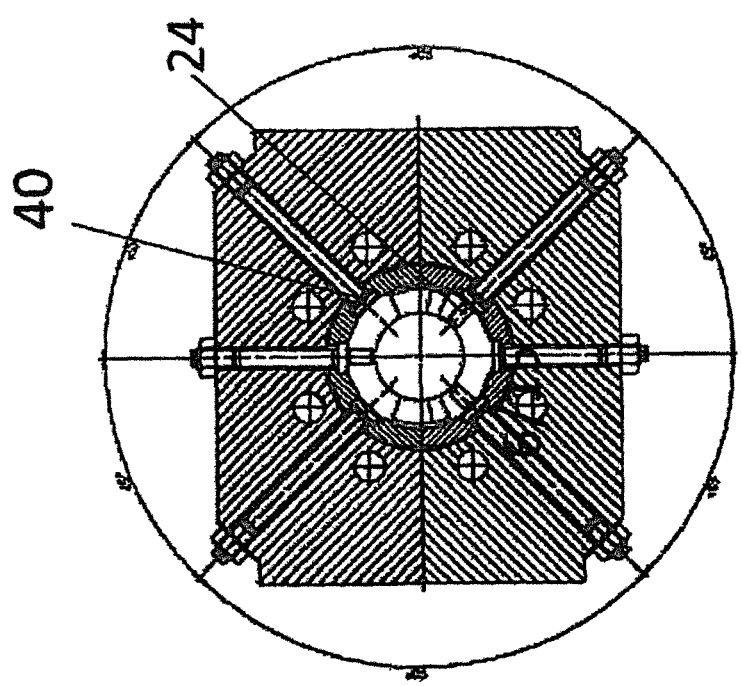
FIG. 4 shows a sectional view according to FIG. 2 as occupied with three kneading bolts.

FIG. 7*b* shows the position of the kneading bolts of the three-rowed arrangement from FIG. 4;

FIG. 8*a* shows the angle graduation of a six-bladed worm shaft; and

Figure 5:
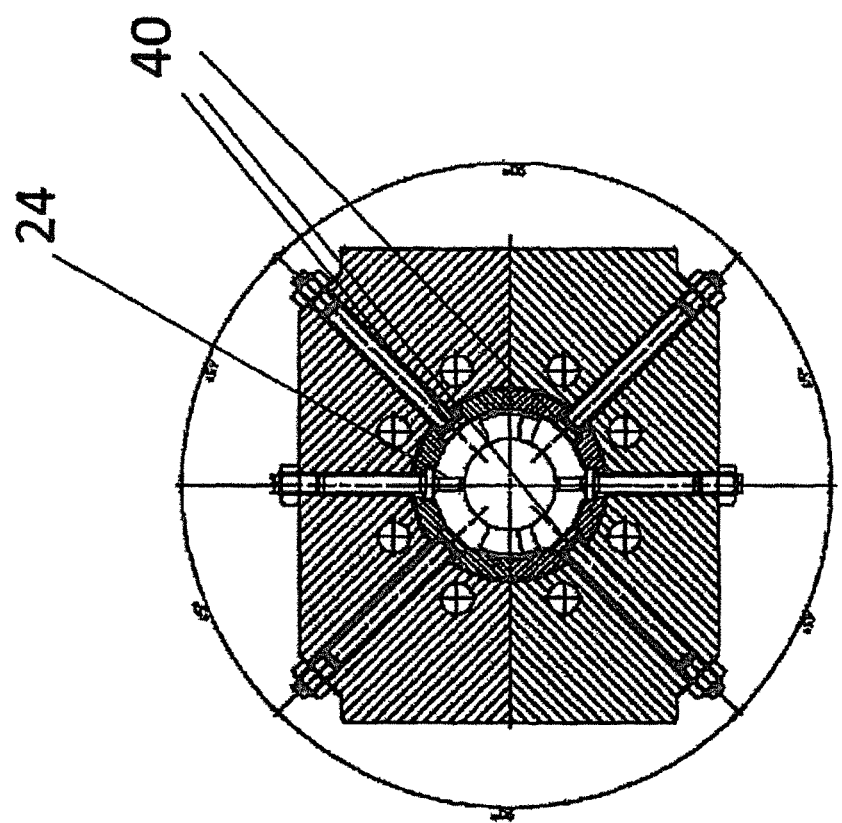
FIG. 5 shows a sectional view according to FIG. 2 as occupied with two kneading bolts.
Figure 9:
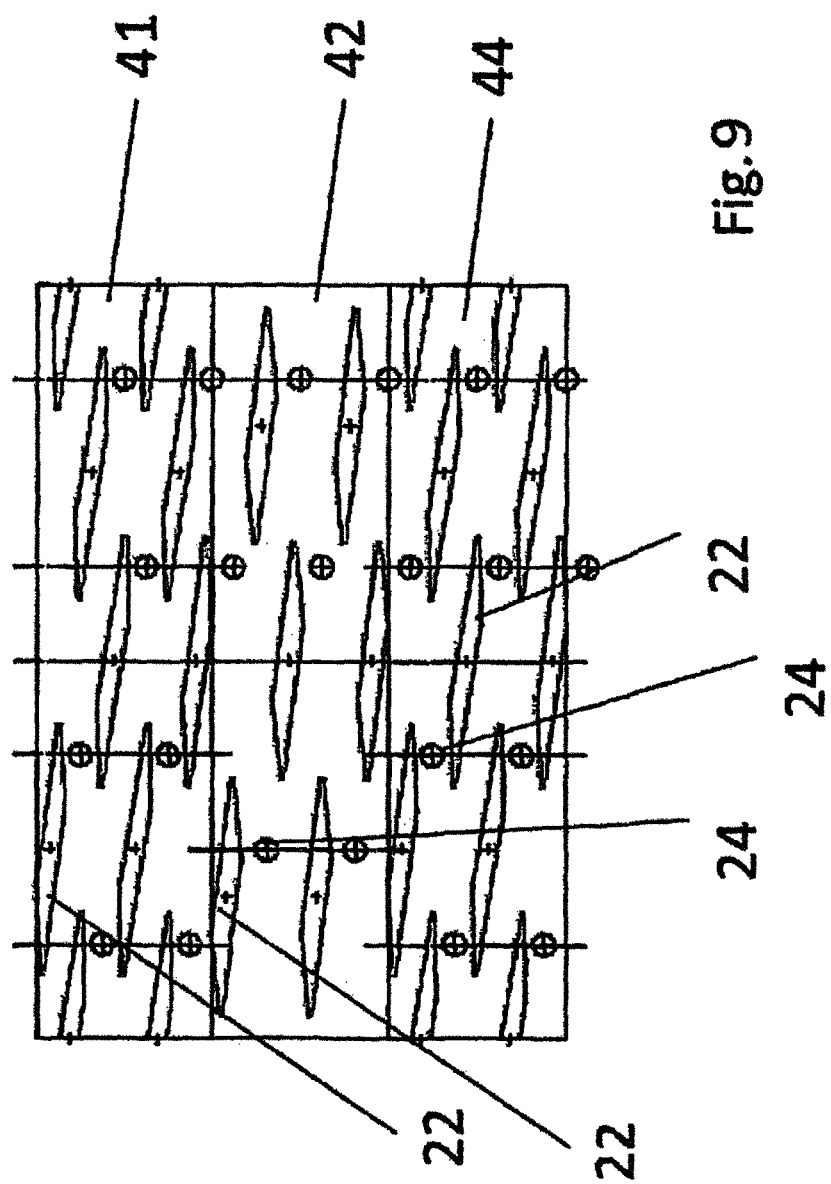
Figure 13A:
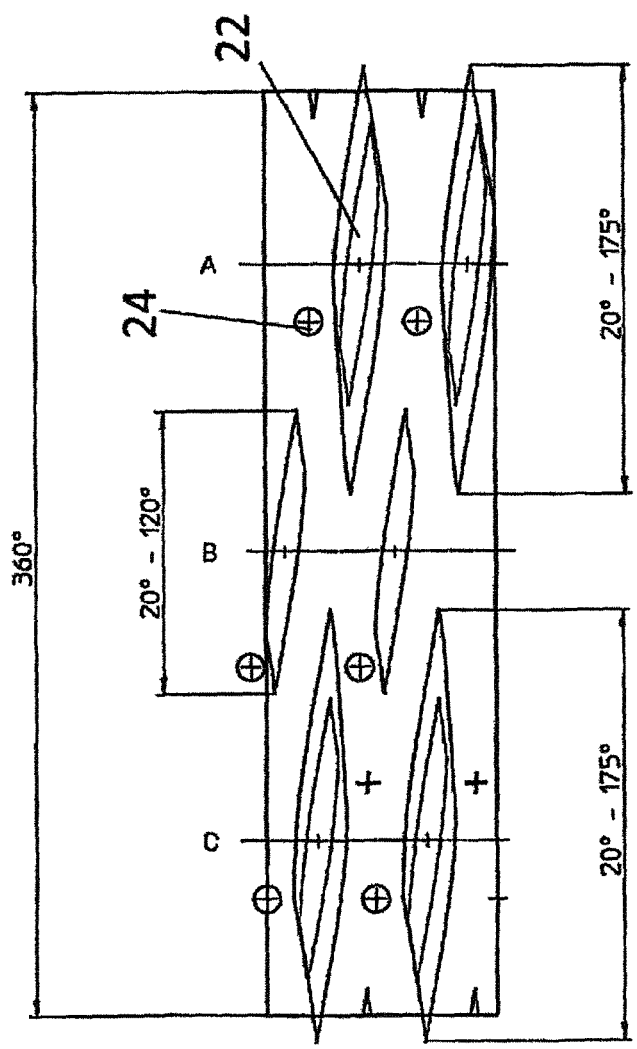
Figure 13B:
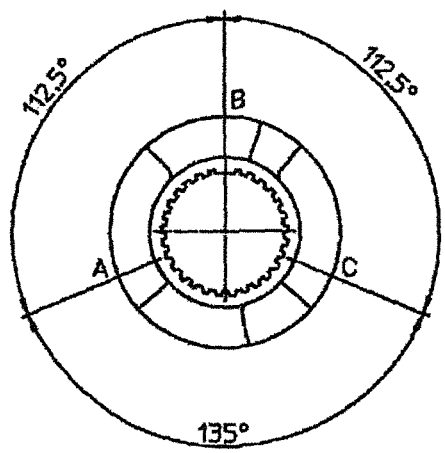

FIG. 8*b* shows the position of the kneading bolts of the two-rowed arrangement from FIG. 5;

FIG. 9 shows the position of the blade elements in a worm shaft, wherein a four-bladed worm shaft has a three-bladed section, and accordingly the position of the corresponding kneading bolts;

FIG. 10 shows the position of the blade elements in a worm shaft, wherein a two-bladed worm shaft has a three-bladed section, and accordingly the position of the corresponding kneading bolts;

FIG. 11 shows the position of the blade elements in a worm shaft, wherein a six-bladed worm shaft has a three-bladed section, and accordingly the position of the corresponding kneading bolts;

FIG. 12*a-d* show, in a version of the embodiment according to FIG. 6*a* and FIG. 6*b*, a two-bladed worm shaft with two, three, four or six rows of kneading bolts;

FIG. 12*e* shows the angle graduation therefor;

FIG. 13*a* show in a version of the embodiment according to FIG. 7*a* and FIG. 7*b* a three-bladed worm shaft with differently sized blade elements; and FIG. 13*b* shows the angle graduation therefor.

Figure 1A:
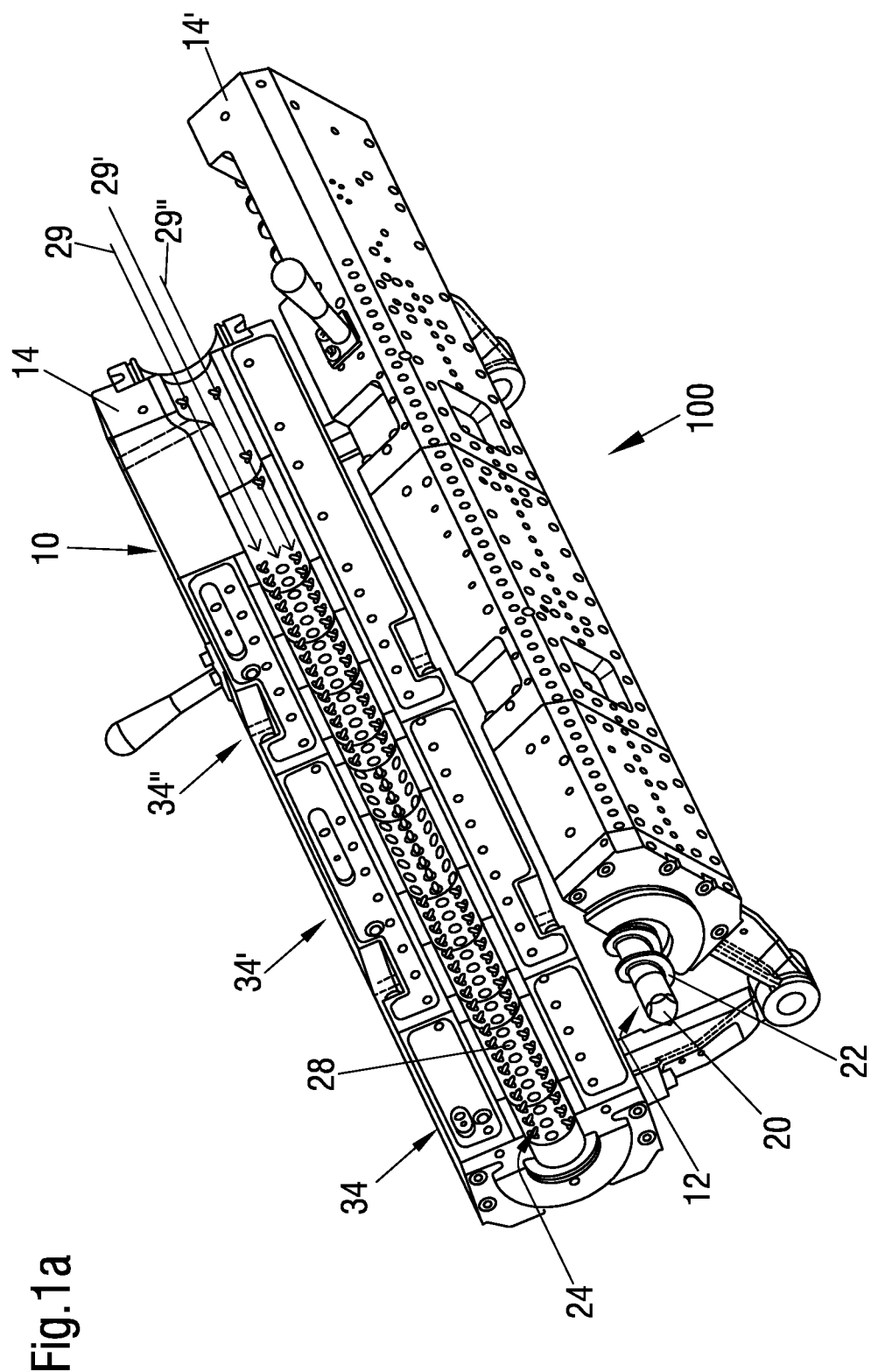
Figure 1B:
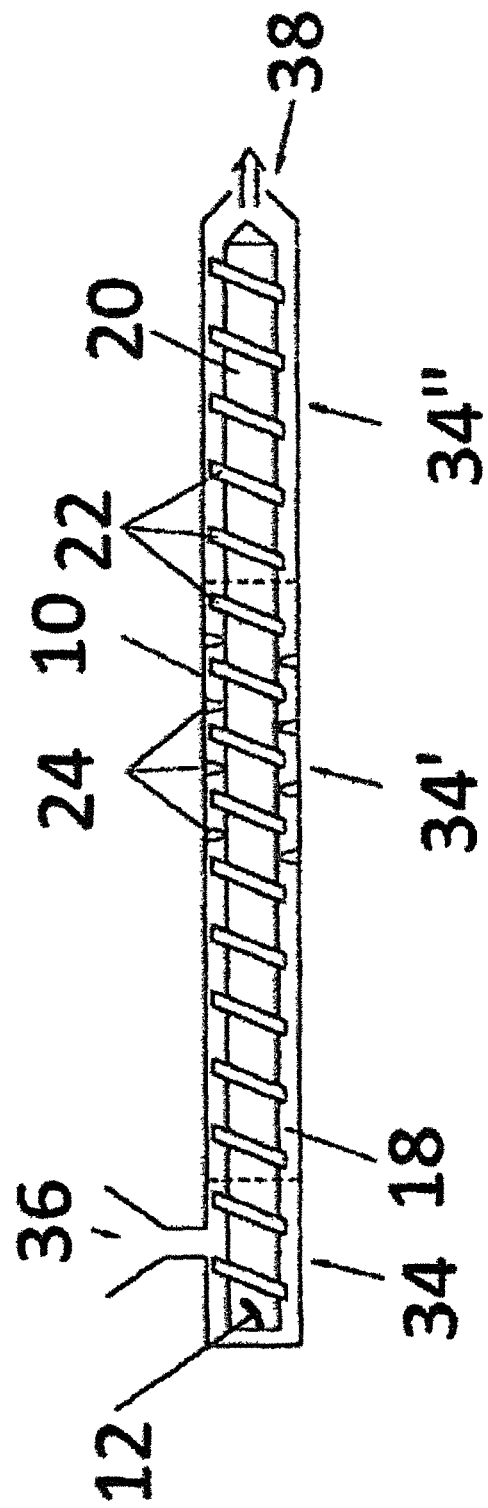
Figure 1C:
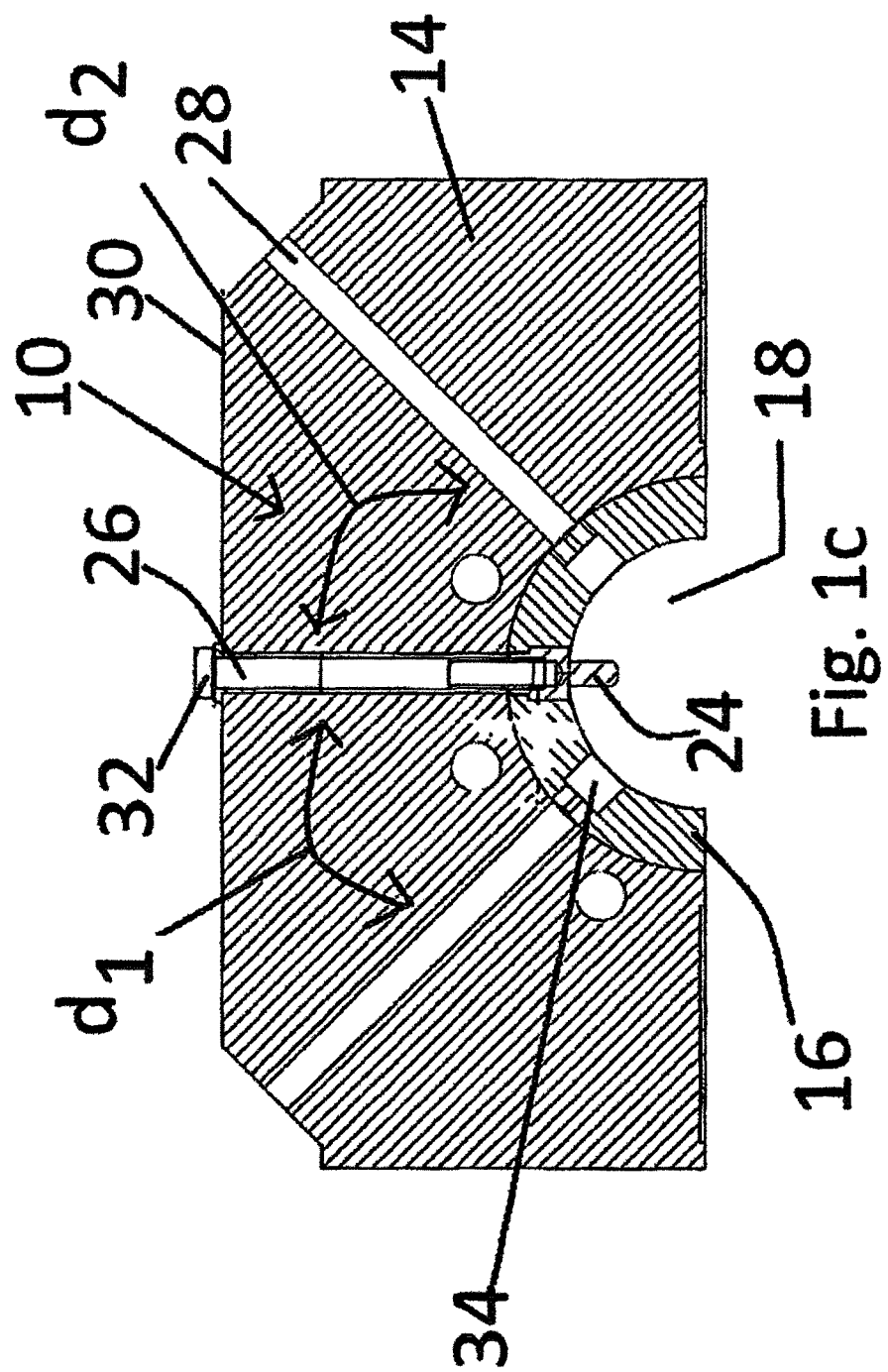

The mixing and kneading machine being schematically shown in various views in FIGS. 1*a*, 1*b* and 1*c* and being labelled with 100 throughout comprises a housing 10 and a worm shaft 12 being arranged in the housing 10. The housing 10 comprises two housing halves 14, 14' which are clad inside with a so-called housing shell 16. In the present patent application, the housing shell 16 is deemed to be a component of the housing 10. The inner peripheral surface of the housing 10 limits, when the two housing halves 14, 14' are closed, a cylindrically hollow interior 18, i.e., an interior 18 with a circular cross-section.

The materials of the housing shell 16 are selected according to the extrudate properties, such as corrosion, abrasion, combination of the two, tribological properties, etc. Housing shells 16 are usually produced with a gap, which arises as a result of production by the separation of a pre-manufactured hollow cylinder, e.g. by means of wire eroding. Half shells without a gap for extrudate are also known, said half shells not permitting a gap due to the requirements of the extrudate or extrudate properties, such as food products, thermal sensitivity, or the like.

The worm shaft 12 comprises a shaft bar 20, on the circumferential surface of which blade elements 22 are arranged. In the two housing halves 14, 14', receptacles 28 are provided for kneading element 24, i.e., for kneading bolts, kneading cogs, and the like. Thus, each of the receptacles 28, as shown in FIG. 1c, is a bore 28, which extends from the inner peripheral surface of the housing shell 16 through the housing wall. The lower, radially inwards end of each receptacle 28 is designed to be square in the cross-section. Each kneading bolt 24 has, on the lower end thereof, an end fitting exactly into the square, radially inwards end of the receptacles 28 and is thereby fixed non-rotatably into the receptacle 28 in the used state. By way of derogation to the embodiment shown specifically in FIG. 1c, the lower, radially inwards end of each receptacle 28 can be designed to have three edges or six edges in the cross-section.

The kneading bolt 24 is connected on the end thereof being positioning in the receptacle 28 with a fixing element 26 used in the overlying end of the receptacle 28 by means of screwing. The individual kneading bolts 24 are thereby each held by a fixing element 26, which has on the end thereof opposite the kneading bolt a male thread section, which projects over the outer wall 30 of the housing 10, where a nut 32 can be screwed in order to fix the fixing element 26 into the housing 10 and thereby also the kneading bolt 24. Alternatively, the kneading bolt 24 can also have an internal thread for a screw and be fixed with a screw instead of using the fixing element 26 and the nut 32.

As can be seen particularly from FIG. 1a, the mutually evenly distanced receptacles 28 for the kneading bolts 24 extend into each of the two housing halves 14, 14', as seen in the axial direction, in the form of three rows 29, 29', 29". The total number of rows of receptacles 29, 29', 29" of the housing is therefore six. In the sense of the present invention, row is taken to mean that a connecting line positioned over the axially spaced receptacles 28 of a row 29, 29', 29" is a straight line. The receptacles 28 of each row 29, 29', 29" are therefore arranged slightly offset against their neighbouring rows 29, 29', 29", as seen in the axial direction of the housing 10, so that the individual blade elements 22 of the worm shaft 12 do not collide with the therein received kneading bolts 24, when the worm shaft 12 rotates and moves back and forth in a translatory movement at the same time.

The mixing and kneading machine 100 according to the invention is characterised, as can be seen more clearly in FIG. 2 through 13, in that at least in one section extending in the axial direction of the housing 10, the receptacles 28 for kneading elements 24, as seen in the cross-section of the housing 10, are distributed non-uniformly over the circumference being defined by the inner peripheral surface of the housing 10. A non-uniform distribution of the receptacles 28 for kneading elements 24 over the circumference defined by the inner peripheral surface of the housing 10 is understood to mean that—as viewed in the cross-section of the housing 10—of all the angular distances $d_1$, $d_2$ between each two receptacles 28 for kneading elements 24 of neighbouring rows 28 on the inner peripheral surface of the housing 10 at least two angular distances $d_1$, $d_2$ are mutually different.

The housing 10 is preferably temperature-controllable by means of one or several thermal appliances or heatable with electrical heating cartridges or heating plates being attached to the outside of the housing and is water-cooled or air-cooled, also cooled where applicable by another fluid, for example by an oil or another fluid or a specific gas.

As is shown in FIG. 1b, the mixing and kneading machine is subdivided in the axial direction into several process sections 34, 34', 34", wherein each process section 34, 34', 34" is adapted to the function of the individual process sections 34, 34', 34' in terms of the number of the kneading bolts 24 and the number and extension of the blade elements 24 on the shaft bar 20. As is shown in FIG. 1a, the three rows 29, 29', 29" of receptacles 28 for kneading bolts 24 in the left section 34 and in the right section 34" of the upper housing half 14, two rows, namely the upper row 29 and the lower row 29", are equipped with kneading bolts 24, whereas the middle row 29' is not equipped with kneading bolts 24. In contrast thereto, of the three rows 29, 29', 29" of receptacles 28 for kneading bolts 24 in the centre section 34' of the upper housing half 14, one row, namely the centre 29', is equipped with kneading bolts 24, whereas the upper row 29 and the lower row 29" are not equipped with kneading bolts 24.

The process section 34 can, for example, be a feed-in section, the process section 34' can be a mixing and homogenising section, and the process section 34" can be a degassing section. The raw material to be mixed is added to the mixing and kneading machine 10 by means of the feed hopper 36, then guided through the process sections 34, 34', 34" and finally discharged through the outlet opening 38.

Instead of the depicted process sections 34, 34', 34", the mixing and kneading machine 100 according to the invention can also, in particular, have four process sections.

FIG. 2 shows a cross-section through the mixing and kneading machine 100 shown in FIG. 1a, however, with an occupation of all six rows 28 with respective kneading bolts 24.

On the basis of the representation of the circle surrounding the mixing and kneading machine 100 in FIG. 2, it can be seen that two rows of receptacles each have the distance $d_1=45°$ from each other, while the other rows of receptacles of the neighbouring housing have the angular distance of $d_2=90°$ from each other.

Otherwise, as was previously usual, with an arrangement with six rows 29, 29', 29" of receptacles 28, no even distribution is provided over the angular range of the inner circle, i.e., in parts of 60°, but rather non-uniform distribution is provided.

Figure 3:
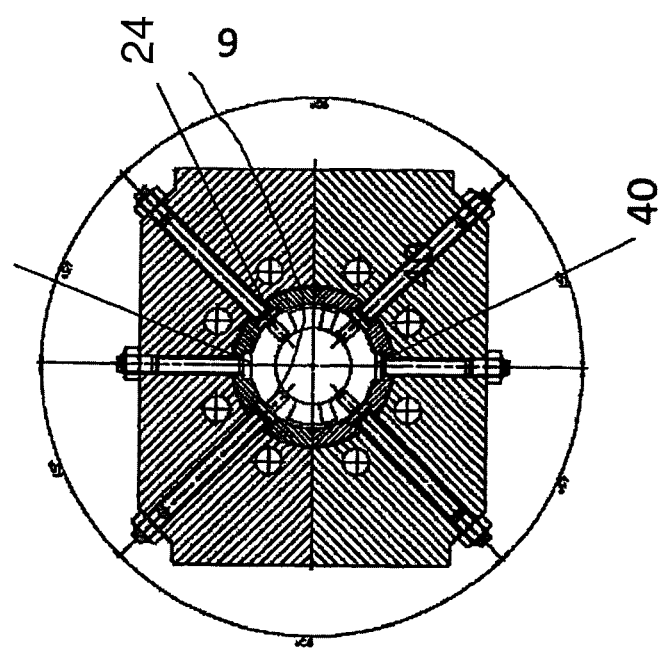
FIG. 3 shows a sectional view according to FIG. 2 as occupied with four kneading bolts.

The non-uniform angular distribution has the advantage that other occupations of the receptacles 28 in the housing 10 are possible:

For example, FIG. 3 illustrates the occupation of just four of the six rows 29, 29', 29" of receptacles 28 with kneading bolts 24, wherein in two of the rows 29, 29', 29" of receptacles 28 a blind bolt 40 is inserted. The blind bolt 40 is provided where the distance on the cross-sectional circumference surface of the housing interior wall to the next receptacle is just 45°, i.e., from both sides. The four kneading bolts 24 in the embodiment according to FIG. 3 thereby have an angular distance of exactly 90°, as is known from conventional mixing and kneading machines.

In the embodiment according to FIG. 4, three of the six rows 29, 29', 29" of receptacles 28 are equipped with kneading bolts 24 and the other three rows with blind bolts 40. In this case, the kneading bolts 24 are non-uniformly distributed, as two kneading bolts 24 have a distance of 90° from each other, and both these kneading bolts 24 have a distance of 135° from the third kneading bolt 24.

In FIG. 5 is illustrated that only two kneading bolts 24 and four blind bolts 40 are provided. The two kneading bolts 24 are exactly opposite each other. This kneading bolt arrangement also corresponds to that of a conventional mixing and kneading machine.

On the basis of FIGS. 2 through 5, it has been explained how the non-uniform distribution of the six rows 29, 29', 29" of receptacles 28 make it possible to realise arrangements with six, four, three and two kneading bolts 24. Particularly, the two housing halves 14, 14' can be folded away from each other. A corresponding kneading bolt 24 can be inserted from the inside together with the corresponding fixing element 26, whereupon then the nuts 32 can be screwed on from the outside. A kneading bolt can be removed again just as quickly and replaced by a blind bolt 40. A blind bolt 40 can be just as quickly removed again in order to reinsert a kneading bolt 24.

It is understood that the worm shaft 12 must be provided in a suitable form as befitting the arrangement of the kneading bolts 24. A worm shaft 12 being flexibly equipable with blade elements 22 can be provided here, so that the blade arrangement is also changed when the kneading bolt arrangement is changed. The complete worm shaft 12 may also be replaced.

FIG. 6a shows in section the worm shaft 12 with the blade elements 22 on the shaft bar 20. The two-bladed worm shaft (two blades per rotation) shown in FIG. 6a can be implemented with a six-row bolt arrangement as shown in FIG. 2. The kneading bolts 24 are illustrated in FIG. 6b, wherein FIG. 6b illustrates how an unrolled outer casing of the worm shaft 12 would look and illustrates the position of the kneading bolts 24 relative to the blade element 22. The blade elements 22 in the two-bladed arrangement extend in the example of FIG. 6a over an angle of almost exactly 90°. This worm shaft 12 in combination with the six bolt rows facilitates an increased shearing of the extrudate, as two or three additional shearing gaps are present compared with the known three or four-bladed worm shafts. As the blade surface, which pushes in the direction of the housing end during a forward stroke of the extrudate in the axial direction, added to the conveying of the extrudate by means of the rotary movement of the worm shaft based on the gradient of the blade, is smaller than with the three or four-bladed elements, a prolonged residence time of the extrudate results in the two-bladed element. At the same time, the gaps between the two blades are larger than with the three or four-bladed elements, this enables the extrudate to flow back against the conveying direction more easily. Thereby the residence time and the axial mixing are further increased, and even more shearing can be applied to the extrudate. With six kneading bolts 24, each three kneading bolts 24 in combination with two blade elements 22 of the two-bladed element being positioned successively in the axial direction form a shearing gap and the two other kneading bolts 24 form a type of barrier, which prevents a greater substream flowing around the shearing gap without this substream experiencing at least some shearing and at the same time due to the flowing around of this "barrier" experiencing an extensional flow, which has an advantageous effect on the distributive mixing of the extrudate.

FIG. 7a shows a three-bladed arrangement, as can be implemented in combination with the three kneading bolt rows from FIG. 4. FIG. 7b shows the corresponding, unrolled representation. With the three-bladed arrangement according to FIG. 7a, it is provided that one of the worm shaft blades 22 extends over an angle (a radian) of 112.5°, with the other two extending over an angle (a radian) of 135°. In this regard, this takes account of the fact that, as explained above on the basis of FIG. 4, two of the kneading bolt distances are 135° and the third is 90°. This embodiment is not set at the exact values of 135° or 112.5°, but rather variations are possible, which also fit to the embodiment of the housing shown in FIG. 2. On the other hand, the worm shaft 12 according to FIGS. 7a and 7b can also be applied to other arrangements than those shown in FIG. 2. Through the asymmetrical arrangement of the blade elements 22 of the three-bladed element with the aforesaid angular division and the arrangement on the worm shaft 12 with a gap exactly below, the even flow of the extrudate into the adjoining two-bladed element is ensured and any dead spaces are eliminated. Through the asymmetrical division and the associated asymmetrical bolt arrangement, a corresponding, free surface is provided, which permits a design of the blade surfaces that is not possible with the known symmetrical three-bladed element.

FIGS. 8a and 8b now illustrate a six-bladed arrangement, as it fits with a two-row kneading bolt arrangement according to FIG. 5. The kneading elements 24 with the associated receptacles of each row are therefore arranged slightly offset against those of their neighbouring rows, as seen in the axial direction of the housing, so that the individual blade elements 22 of the worm shaft 12 do not collide with the therein received kneading bolts 24 when the worm shaft 12 rotates and moves back and forth in a translatory movement at the same time. Each of the six blade elements 22 here has an extension (a radian) of 45°. Typically, the extension—if the distances between the blades are 60°—is between 15° and 75°. In a variation of a uniform distribution, it can be provided (not shown) that at least one blade element is offset by 60°±30°, so that it is closer to one of its neighbours than the other neighbour, the prerequisite for this being an arbitrary extension ε of 15°–40°. This six-bladed worm shaft creates little shearing and therefore temperature increase, as only two bolt paths are equipped, but due to the high number of blade elements the distributive mixing effect is very high, as the extrudate is often split up accordingly and redirected.

With the flexible bolt arrangement depicted here, it is also possible to occupy different worm conveyor sections (which follow each other in the extension direction of the mixing and kneading machine, i.e., in the axial direction of the worm shaft 12) differently, wherein the housing is appropriately equipped with bolts: In this way, FIG. 9 illustrates the transition from one four-bladed section 40 and the related four kneading bolt rows to a three-bladed section 32 and the related three kneading bolt rows and to a further four-bladed section 44 with four kneading bolt rows again.

FIG. 10 illustrates a two-bladed section 46 with six kneading bolt rows, which merges into a three-bladed section 48 with three kneading bolt rows, whereupon in turn a two-bladed section 50 with six kneading bolt rows follows.

FIG. 11 illustrates the transition of a six-bladed section 52 with two kneading bolt rows to a three-bladed section 54 with three kneading bolt rows and back again to a six-bladed section 56 with two kneading bolt rows.

FIG. 12a through d show the case of two, three, four and six kneading bolt rows for a two-bladed embodiment of a worm shaft 12. The extension (the radian) of the blade elements 22 is in the case of FIG. 12a equal to $I_1$ between 20° and 210°. In the case of FIG. 12b, $I_{2a}$ is between 20° and 175°, $I_{2b}$ is between 20° and 210°. In the case of FIG. 12c, $I_3$ is between 20° and 165°. In the case of FIG. 12d, $I_4$ is between 20° and 120°.

FIG. 13a shows an example of a worm shaft 12 with different blade elements 22, of which one has an extension (radian) of between 20° and 120°, the other of between 20° and 175°.

In general, the present invention provides for a high flexibility in the occupation of the housing with kneading bolts or kneading cogs or other kneading elements, as can be seen by a comparison of the present FIGS. 2 through 5, wherefore the worm shaft is equipped to match with suitable blade elements.

For example, the mixing and kneading machine according to the invention has the following combination of characteristics:

The mixing and kneading machine comprises:
  a housing comprised of at least two housing parts, which can be folded away from each other or separated from each other to open the housing, and which provide an interior being circular in cross-section,
  a worm shaft, which rotates during operation in the interior and simultaneously moves back and forth in a translatory movement in the axial direction of the worm shaft,
  a number of kneading elements protruding inwardly from the inside of at least one of the housing, which are arranged in at least two rows, wherein the worm shaft has blade elements, which through the rotation and the translatory movement of the worm shaft draw the material being mixed and kneaded into a gap between the respective blade element and a kneading element, wherein a mixing and kneading effect is achieved by the resulting shearing,
wherein in the housing a number of receptacles for a corresponding number of rows of kneading elements is provided, wherein the receptacles are distributed non-uniformly over the circular arc defined by the circular interior.

With the previously stated mixing and kneading machine, each receptacle can be connected with an outer wall of the housing by means of an opening, particularly for a fixing element.

With the mixing and kneading machine, n rows of receptacles can be provided in the housing, wherein n is a natural number ≥2, and wherein the angular distances $d_1$, $d_2$ between two neighbouring receptacles deviate between the value of 360°/n and at least 1°, preferably at least 2.5°, particularly preferably at least 5°, very particularly preferably at least 10°.

With the mixing and kneading machine, n rows of receptacles for kneading element can be provided at least in one section of the mixing and kneading machine, wherein at most n−1 rows of receptacles are occupied by kneading elements.

With the mixing and kneading machine, six rows of receptacles for kneading elements can be provided at least in one section of the mixing and kneading machine, which are positioned facing each other in pairs thus forming three pairs, wherein of the angular distances between the three pairs two distances are between 40° and 50° and one distance is between 80° and 100°.

With the mixing and kneading machine, the blade elements can be mounted on a shaft bar with circular cross-section, and at least two of the blade elements can be mutually different from each other in the value of the angle over which they extend.

With the mixing and kneading machine, the blade elements can be arranged in three rows at least in one section of the mixing and kneading machine, wherein all blade elements in a row extend over the same angle, wherein the values of the angle over which the three blade elements extend, amount to between 20° and 175° for two of the three rows, and between 20° and 120° for the third row.

With the mixing and kneading machine, a first number of rows from a predefined number of rows of receptacles for kneading elements in a first section of the housing can be occupied with kneading elements and a second number of rows can be occupied with kneading elements in a second section of the housing, wherein the second number is different to the first number, and wherein a corresponding first section of the worm shaft is allocated to the first section of the housing, where the number of blade elements is a third number and the second section of the housing corresponds to a second section of the worm shaft, where the number of blade elements is a fourth number, wherein the fourth number is different to the third number.

With the mixing and kneading machine, a first or a third number of rows from a predefined number of rows of receptacles for kneading elements in a first or a third section of the housing can be occupied with kneading elements and the same first or third number of rows can be occupied with kneading elements in a second or a fourth section of the housing as in the first or third section of the housing, wherein with the first or with the third section of the housing, wherein a corresponding first or third section of the worm shaft is allocated to the first or third section of the housing and a further section of the worm shaft corresponds to the second or fourth section of the housing, wherein the number of blade elements in the first or third section of the worm shaft is equal to the other section of the worm shaft.

With the mixing and kneading machine, the blade elements can be arranged in the first or third section of the worm shaft and in the further section thereof respectively in six rows and extend over a respectively identical angle of between 15° and 75°, wherein the offset angle is between 10° and 20°, preferably 15°.

A housing for a mixing and kneading machine comprising at least two housing parts, which can be folded away from each other or separated from each other to open the housing and which provide an interior being circular in cross-section, which can be provided on the housing part with a number of receptacles for a corresponding number of rows for kneading elements, wherein the receptacles are distributed non-uniformly over the circular arc defined by the circular interior.

With one housing half for a housing of a mixing and kneading machine with an inner wall, having the form of a circle segment in the cross-section, wherein at least two rows of receptacles for kneading elements are arranged on the inner wall, an angular distance of two neighbouring rows can deviate from the value 360°/n, wherein n is a natural number ≥2, by least 1°, preferably 2.5°, particularly preferably at least 5°, very particularly preferably at least 10°.

With a shell for a housing half of a housing of a mixing and kneading machine, wherein the shell has the form of a circle segment in the cross-section and comprises at least two rows of receptacles for kneading elements, an angular distance of two neighbouring rows can deviate from the value 360°/n, wherein n is a natural number ≥2, by least 1°, preferably 2.5°, particularly preferably at least 5°, very particularly preferably at least 10°.

With a worm shaft for a mixing and kneading machine with a shaft bar with circular cross-section and a number of blade elements mounted on the shaft bar, at least two of the blade elements can be mutually different from each other in the value of the angle over which they extend.

With the aforementioned worm shaft, the blade elements can be arranged in three rows at least in one section of the mixing and kneading machine, wherein all blade elements in a row extend over the same angle, wherein the values of the angle over which the three blade elements extend, amount to between 110° and 116° for two of the three rows, and between 128° and 140° for the third row.

With the aforementioned worm shaft, the number of blade elements in a first section of the worm shaft can deviate from the number of blade elements in a second section of the worm shaft.

With a worm shaft for a mixing and kneading machine with a shaft bar with circular cross-section and a number of blade elements mounted on the shaft bar, in a first or a third section of the worm shaft the number of rows of blade elements can be equal to the number of rows of blade elements in a further section of the worm shaft, wherein however the blade elements in the further section are offset against the blade elements in the first or third section of the worm shaft by an offset angle so that the blade elements are not flush.

With the aforementioned worm shaft, the blade elements can be arranged in their first or third section and in their further section respectively in six rows and can extend over a respectively identical angle of between 15° and 75°, and wherein the offset angle is between 10° and 20°, preferably 15°.

LIST OF REFERENCE SYMBOLS

10 Housing
12 Worm shaft
14, 14' Housing half
16 Housing shell
18 Interior
20 Shaft bar
22 Blade element
24 Kneading element/kneading bolt
26 Fixing element
28 Receptacle/bore for kneading element
29, 29', 29" (Axially extending) row of receptacles for kneading elements
30 Outer wall
32 Nut
34, 34', 34" Process section
36 Feed hopper
38 Outlet opening
40 Blind bolt
41, 42, 44, 46,
48, 50, 52, 54, 56 Section
100 Mixing and kneading machine
$d_1$, $d_2$ Angular distances between two neighbouring rows of receptacles for kneading elements

What is claimed is:

1. A mixing and kneading machine (100) for continual processing comprising:
   a housing (10), in which a hollow interior (18) being limited by the inner peripheral surface of the housing (10) is designed,
   a worm shaft (12) extending at least in some sections in the axial direction through the interior (18), which rotates during operation in the interior (18) and simultaneously moves back and forth in a translatory movement in the axial direction, and
   at least six receptacles (28) provided in the housing (10) for kneading elements (24) extending at least in some sections from the inner peripheral surface of the housing (10) into the housing (10), wherein the receptacles (28) are arranged on the inner peripheral surface of the housing (10) in at least two rows (29, 29', 29") extending in the axial direction over at least one section of the inner peripheral surface of the housing (10), wherein at least two comprise at least three receptacles (28) for kneading elements (24),
   wherein the worm shaft (12) comprises a shaft bar (20), on the circumferential surface of which at least two blade elements (22) are arranged extending radially outwards from the shaft bar (20) in the direction of the inner peripheral surface of the housing (10),
   characterised in that the receptacles (28) for kneading elements (24) of the at least two rows, as seen in the cross-section of the housing (10), are distributed non-uniformly over the circumference being defined by the inner peripheral surface of the housing (10).

2. The mixing and kneading machine (100) according to claim 1, characterised in that on the section of the circumferential surface of the shaft bar (20) of the worm shaft (12) extending in the axial direction of the housing (10), said worm shaft (12) being positioned in the section of the inner peripheral surface of the housing (10), over which the rows (29, 29', 29") comprising at least two, respectively at least three receptacles (28) for kneading elements (24) extend in the axial direction of the housing (10), at least six blade elements (22) are arranged extending radially outwards from the shaft bar (20) in the direction of the inner peripheral surface of the housing (10), wherein the blade elements (22) on this section of the shaft bar (20) are arranged in at least two rows extending in the axial direction over this section of the circumferential surface of the shaft bar (20), wherein at least two rows—as seen in the axial direction—comprise at least three blade elements (22).

3. The mixing and kneading machine (100) according to claim 2, characterised in that blade elements (22) of at least one of the rows differ in the value of the angular section, by which they extend over the cross-sectional circumference of the shaft bar (20), by the value of the angular section of the blade elements of at least one of the other rows.

4. The mixing and kneading machine (100) according to claim 1, characterised in that each receptacle (28) is a bore (28), into which extends a fixing element (26) being connectable with a kneading element (24), which is fixed on the outer wall (30) of the housing (10) by a nut (32).

5. The mixing and kneading machine (100) according to claim 1, characterised in that the inner peripheral surface of the housing (10) is circular in the cross-section and at least one of the angular distances ($d_1$, $d_2$), as seen in the cross-section of the housing (10) between two receptacles (28) of neighbouring rows (29, 29', 29") on the inner peripheral surface of the housing (10), deviates from the value of 360°/n by at least 1°, wherein n is the number of rows (29, 29', 29") of receptacles (28).

6. The mixing and kneading machine (100) according to claim 1, characterised in that 2 to 11 rows (29, 29', 29") of receptacles (28) for kneading elements (24) extending in the axial direction over at least one section of the inner peripheral surface of the housing (10) are arranged on the inner peripheral surface of the housing (10), wherein each of the rows (29, 29', 29") comprises at least five receptacles (28) for kneading elements (24).

7. The mixing and kneading machine (100) according to claim 6, characterised in that six rows (29, 29', 29") of receptacles (28) for kneading elements (24) are provided on the inner peripheral surface of the housing (10), of which two rows are each mutually opposite each other in order to form three pairs on the inner peripheral surface of the housing (10), wherein of the three angular distances each formed between two neighbouring pairs, two angular distances are between 20° and 70° and one angular distance is between more than 70° and 120°.

8. The mixing and kneading machine (100) according to claim 1, characterised in that at least two of the blade elements (22) of the worm shaft (12) are mutually different in the value of the angular section by which they extend to the cross-sectional circumference of the shaft bar (20).

9. The mixing and kneading machine (100) according to claim 8, characterised in that at least in one section (41, 42, 44, 46, 48, 50, 52, 54, 56) of the mixing and kneading machine (100) extending in the axial direction, the blade elements (22) are arranged in three rows extending in the axial direction on the shaft bar (20), wherein all blade elements (22) of a row extend respectively over the same angular section of the cross-sectional circumference of the shaft bar (20), but the values of the angular sections, over which the blade elements (22) extend at least between two different rows, can be mutually different, wherein the values of the angular section, over which the individual blade elements (22) of a row extend, are between 20° and 175°.

10. The mixing and kneading machine (100) according to claim 1, characterised in that in various sections (41, 42, 44, 46, 48, 50, 52, 54, 56) extending in the axial direction of the housing (10), a different number of rows (29, 29', 29") of receptacle (28) being provided in the inner peripheral surface of the housing (10) is occupied with kneading elements (24), wherein the housing (10) has 2 to 24 sections (41, 42, 44, 46, 48, 50, 52, 54, 56) extending in the axial direction, of which at least one section is occupied with a different number of kneading elements than the rest of the sections.

11. The mixing and kneading machine (100) according to claim 10, characterised in that of the number of rows (29, 29', 29") of receptacles (28) for kneading elements (24) in a first section (28) of the housing (10) extending in the axial direction, a first number of rows (29, 29', 29") is occupied with kneading elements (24) and in a second section of the housing (10) extending in the axial direction, a second number of rows (29, 29', 29") is occupied with kneading elements (24), wherein the second number is different to the first number, and in that a corresponding first section of the worm shaft (12) extending in the axial direction is allocated to the first section of the housing (10), where the number of blade elements (22) is a third number, and the second section of the housing (10) corresponds to a second section of the worm shaft (12) extending in the axial direction, where the number of blade elements (22) is a fourth number, wherein the fourth number is different to the third number.

12. The mixing and kneading machine (100) according to claim 1, characterised in that in various sections (41, 42, 44, 46, 48, 50, 52, 54, 56) extending in the axial direction of the housing (10) the same number of rows (29, 29', 29") of receptacles (10) being provided in the inner peripheral surface of the housing (10) is occupied with kneading elements (24), but in each of the sections (41, 42, 44, 46, 48, 50, 52, 54, 56) or in at least one of the sections (41, 42, 44, 46, 48, 50, 52, 54, 56) other rows (29, 29', 29") of receptacles (28) are occupied with kneading elements (24) than in at least one other section (41, 42, 44, 46, 48, 50, 52, 54, 56), wherein the housing (10) has 2 to 24 sections (41, 42, 44, 46, 48, 50, 52, 54, 56) extending in the axial direction, wherein at least in one section at least one other row (29, 29', 29") of receptacles is occupied with kneading elements (24) than in at least one other section.

13. The mixing and kneading machine (100) according to claim 1, characterised in that of the number of rows (29, 29', 29") of receptacles (28) for kneading elements (24) in a first and a third section of the housing (10) extending in the axial direction a first and a third number of rows (29, 29', 29") is occupied with kneading elements (24) and in a second and a fourth section of the housing (10) extending in the axial direction the same first or third number of rows (29, 29', 29") is occupied with kneading elements (24) as in the first or in the third section of the housing (10), wherein a corresponding first and third section of the worm shaft (12) extending in the axial direction is allocated to the first and third section of the housing (10) and a second and fourth section of the worm shaft (12) is allocated to the second and fourth section of the housing (10), wherein the number of blade elements (22) in the first or third section of the worm shaft (12) is the same as in the second or fourth section of the worm shaft (12), wherein however the blade elements (22) in the second and fourth section are displaced against the blade elements (22) in the first and third section of the worm shaft by an offset angle so that the blade elements (22) are not flush.

14. The mixing and kneading machine (100) according to claim 13, characterised in that the blade elements (22) are arranged in the first or third section of the worm shaft (12) and in the second and fourth section of the worm shaft (12) respectively in six rows and extend over a respectively identical angular section of the cross-sectional circumference surface of the shaft bar (20) of between 15° and 75°, wherein the offset angle is between 10° and 20°.

15. The mixing and kneading machine (100) according to claim 1, characterised in that the blade elements (22) are arranged in at least two rows extending in the axial direction on the shaft bar (20), wherein in a first or a third section of the worm shaft (12) the number of rows of blade elements (22) is equal to the number of rows of blade elements (22) in a further section of the worm shaft (12), wherein however the blade elements (22) in the further section are offset against the blade elements (22) in the first or third section of the worm shaft (12) by an offset angle so that the blade elements (22) are not flush, wherein the blade elements (22) are arranged in their first or third section and in their further section respectively in six rows and extend over a respectively identical angle of between 15° and 75°, and wherein the offset angle is between 10° and 20°.

* * * * *